United States Patent
Sonoura

(10) Patent No.: US 10,496,093 B2
(45) Date of Patent: Dec. 3, 2019

(54) MOVEMENT CONTROL SYSTEM, MOVEMENT CONTROL DEVICE, AND COMPUTER-IMPLEMENTED PROGRAM FOR MOVEMENT CONTROL

(71) Applicant: Kabushiki Kaisha Toshiba, Tokyo (JP)

(72) Inventor: Takafumi Sonoura, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 54 days.

(21) Appl. No.: 15/688,944

(22) Filed: Aug. 29, 2017

(65) Prior Publication Data

US 2018/0267540 A1     Sep. 20, 2018

(30) Foreign Application Priority Data

Mar. 17, 2017  (JP) ................................. 2017-053658

(51) Int. Cl.
*G05D 1/00* (2006.01)
*G05D 1/02* (2006.01)

(52) U.S. Cl.
CPC ........... *G05D 1/0088* (2013.01); *G05D 1/024* (2013.01); *G05D 1/0221* (2013.01); *G05D 1/0274* (2013.01); *G05D 2201/0207* (2013.01); *G05D 2201/0216* (2013.01)

(58) Field of Classification Search
CPC .... G05D 1/0088; G05D 1/0221; G05D 1/024; G05D 1/0274; G05D 2201/0207; G05D 2201/0216
See application file for complete search history.

(56) References Cited

U.S. PATENT DOCUMENTS

| 2014/0309835 A1* | 10/2014 | Yamamoto | G05D 1/0217 701/25 |
| 2015/0239125 A1 | 8/2015 | Takaoka | |
| 2016/0062361 A1* | 3/2016 | Nakano | G05D 1/024 701/25 |

FOREIGN PATENT DOCUMENTS

| JP | 63-83804 | 4/1988 |
| JP | 7-129238 | 5/1995 |
| JP | 2000-222563 | 8/2000 |
| JP | 2004-98233 | 4/2004 |
| JP | 2005-310043 | 11/2005 |
| JP | 2007-249632 | 9/2007 |
| JP | 2007-323119 | 12/2007 |

(Continued)

*Primary Examiner* — Aaron L Troost
(74) *Attorney, Agent, or Firm* — Finnegan, Henderson, Farabow, Garrett & Dunner, L.L.P.

(57) ABSTRACT

A movement control system, a movement control device, and a program capable of generating a path corresponding to a more detailed surrounding environment are provided. A movement control system of an embodiment includes a first map generating unit and a second map generating unit. The first map generating unit generates first map information indicating a distribution of existence states related to a possibility of existence of a physical object on the basis of a position of the physical object measured by a measurement unit. The second map generating unit generates second map information indicating the existence state of the physical object of which a period during which the existence state is maintained up to a current time is within a predetermined period from the first map information.

18 Claims, 12 Drawing Sheets

(56) References Cited

FOREIGN PATENT DOCUMENTS

| JP | 2014-182590 | 9/2014 |
| JP | 2014-219721 | 11/2014 |
| JP | 2015-158714 A | 9/2015 |

\* cited by examiner

MOVEMENT CONTROL SYSTEM, MOVEMENT CONTROL DEVICE, AND COMPUTER-IMPLEMENTED PROGRAM FOR MOVEMENT CONTROL

TECHNICAL FIELD

Embodiments of the present invention generally relate to a movement control system, a movement control device, and a computer-implemented program for movement control.

BACKGROUND ART

Automation of main tasks for movement such as transportation, circulation, and inspection work of baggage is expected. It is important to autonomously move a robot to automate such tasks. Under a general environment in which circumstances around a robot change over time, it may be difficult to cope with dynamic obstacles and quasi-static obstacles during autonomous movement.

For example, autonomous performance is enhanced by utilizing external information such as Global Positioning System (GPS) position information and detailed road map information provided by a car navigation system or the like during automatic running of a vehicle. Robots for in-facility and indoor movement, for which support based on the above-described external information cannot be expected, are required to acquire a movement map for controlling movement. Thus, there is a possibility that a degree of difficulty of autonomy of movement will be high.

Navigation accuracy is expected to be improved by adopting map composition technology such as simultaneous localization and mapping (SLAM) during autonomous movement. However, map updating and matching processes cannot keep up with a rapidly changing dynamic surrounding environment. Therefore, there is a possibility of a failure in self-position recognition and path generation.

As a method of coping with a change in topography, for example, a change in an existence state of an obstacle around a robot, it is conceivable for a certainty factor (existence accuracy) to be updated with a grid map. Thus, it is possible to reduce an influence of noise (sensor noise) mixed in a signal detected by a sensor and improve the accuracy of position recognition. However, because information set in the grid map is merely modified, it is difficult to cope with a dynamic environment in which obstacles that change significantly with time exist. For example, if a threshold value for reliability is lowered, information about a map to be referred to may be disturbed due to noise such as dynamic obstacles. On the other hand, if the threshold value is increased, it may not be possible to cope with a case in which an environment actually changes.

PRIOR ART REFERENCE

Patent Reference

[Patent Reference 1] Japanese Unexamined Patent Application, First Publication No. 2007-249632
[Patent Reference 2] Japanese Unexamined Patent Application, First Publication No. 2007-323119

SUMMARY

An objective of the present invention is to provide a movement control system, a movement control device, and a program capable of generating a path corresponding to a more detailed surrounding environment.

A movement control system of an embodiment includes a first map generating unit and a second map generating unit. The first map generating unit generates first map information indicating a distribution of existence states related to a possibility of existence of a physical object on the basis of a position of the physical object measured by a measurement unit. The second map generating unit generates second map information indicating the existence state of the physical object of which a period during which the existence state is maintained up to a current time is in a predetermined period from the first map information.

EMBODIMENTS

Hereinafter, a movement control system, a movement control device, and a computer-implemented program for a movement control system of embodiments will be described below with reference to the drawings.

First Embodiment

Figure 1:
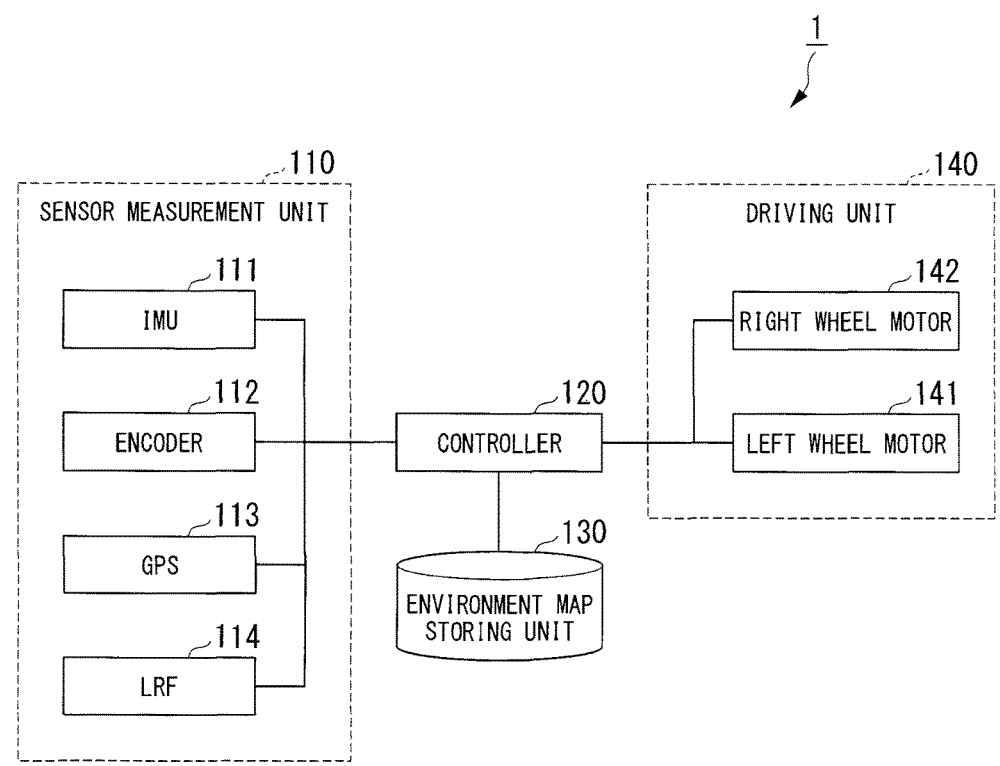
FIG. 1 is a schematic block diagram illustrating an overall configuration of a robot system according to a first embodiment.

First, the first embodiment will be described.
FIG. 1 is a schematic block diagram illustrating an overall configuration of a robot system 1 according to the present embodiment. The robot system 1 is, for example, an autonomous movement control system including independent two-wheel drive wheels as a moving means for moving a position of a robot and a motor for driving the wheels.

The robot system 1 according to the present embodiment includes a sensor measurement unit 110, a controller 120, an environment map storing unit 130, and a driving unit 140. The sensor measurement unit 110 and the driving unit 140 are installed in a main body of a robot (not illustrated). The controller 120 and the environment map storing unit 130 may be installed in the robot main body or may be separate from each other as long as they are communicably connected to the sensor measurement unit 110 and the driving unit 140. Further, the controller 120 and the environment map storing unit 130 may be realized as a single movement control device.

The sensor measurement unit 110 measures a state of motion of the robot and a surrounding environment. The sensor measurement unit 110 outputs motion state information indicating the measured motion state and environmental state information indicating a state of an environment to the controller 120.

The sensor measurement unit 110 includes an inertial measurement unit (IMU) (inertial sensor) 111, an encoder 112, a global positioning system (GPS) unit 113, and a laser range finder (LRF) (ranging sensor) 114.

The IMU 111 measures its own direction and acceleration and acquires inertial sensor information indicating the measured direction and acceleration. The IMU 111 outputs the acquired inertial sensor information as the motion state information to the controller 120.

The encoder 112 detects a rotation speed of each of the two wheels. The encoder 112 outputs encoder information indicating the detected rotation speed to the controller 120 as the motion state information.

The GPS unit 113 receives GPS signals from at least three GPS satellites and measures its own absolute position on the basis of a phase difference between the received GPS signals (GPS positioning). The GPS unit 113 outputs GPS positioning information indicating the measured absolute position as the motion state information to the controller 120.

The LRF 114 measures a distance from its own position to a surrounding physical object. More specifically, the LRF 114 measures a distance to the physical object in each direction on the basis of a phase difference between a laser beam it outputs itself and a laser beam reflected by a surface of the physical object reflecting the laser beam. In the following description, a physical object that can inhibit movement of the robot is referred to as an obstacle. The LRF 114 outputs ranging sensor information indicating the distance to the physical object in each measured direction as the environmental state information to the controller 120.

In the sensor measurement unit 110, some of the IMU 111, the encoder 112, and the GPS unit 113 may be omitted or a sensor that acquires the motion state information on the basis of other detection principles may be provided as a sensor that acquires the motion state information. Also, in the sensor measurement unit 110, a sensor that acquires the environmental state information on the basis of other detection principles may be provided as a sensor that acquires the environmental state information instead of the LRF 114 or together with the LRF 114.

The controller 120 is a movement control system that controls autonomous movement of the robot on the basis of the motion state information and the environmental state information input from the sensor measurement unit 110. The controller 120 estimates a position (a self-position) of the robot based on the motion state information. The controller 120 generates environment map information indicating the existence of the physical object in the surrounding environment on the basis of the estimated self-position and the environmental state information. For example, the controller 120 sets a self-position at a current time as a departure spot and generates a movement path to a target spot on the basis of the generated environment map information. The controller 120 determines a target speed so that an operation is performed on the movement path generated from the self-position and determines a target rotation speed of an axle of each of the two wheels according to the determined target speed. The controller 120 supplies electric power corresponding to the target rotation speed determined for each of the wheels to the driving unit 140. Power for a left wheel of the two wheels and power for a right wheel are referred to as left wheel power and right wheel power, respectively. A functional configuration of the controller 120 will be described below.

The environment map storing unit 130 is configured to include a memory for storing the environment map information generated by the controller 120. An example of the environment map information will be described below together with a functional configuration of an environment map generating unit 122 of the controller 120.

The driving unit 140 drives motion of the robot. The driving unit 140 includes a left wheel motor 141 and a right wheel motor 142. The left wheel motor 141 and the right wheel motor 142 are motors for independently rotating the axle of the right wheel and the axle of the left wheel in the two wheels of the robot system 1. The left wheel motor 141 and the right wheel motor 142 rotate the axles of the left wheel and the right wheel, respectively, by being supplied with the left wheel power and the right wheel power from the controller 120.

Next, the functional configuration of the controller 120 according to the present embodiment will be described.

Figure 2:
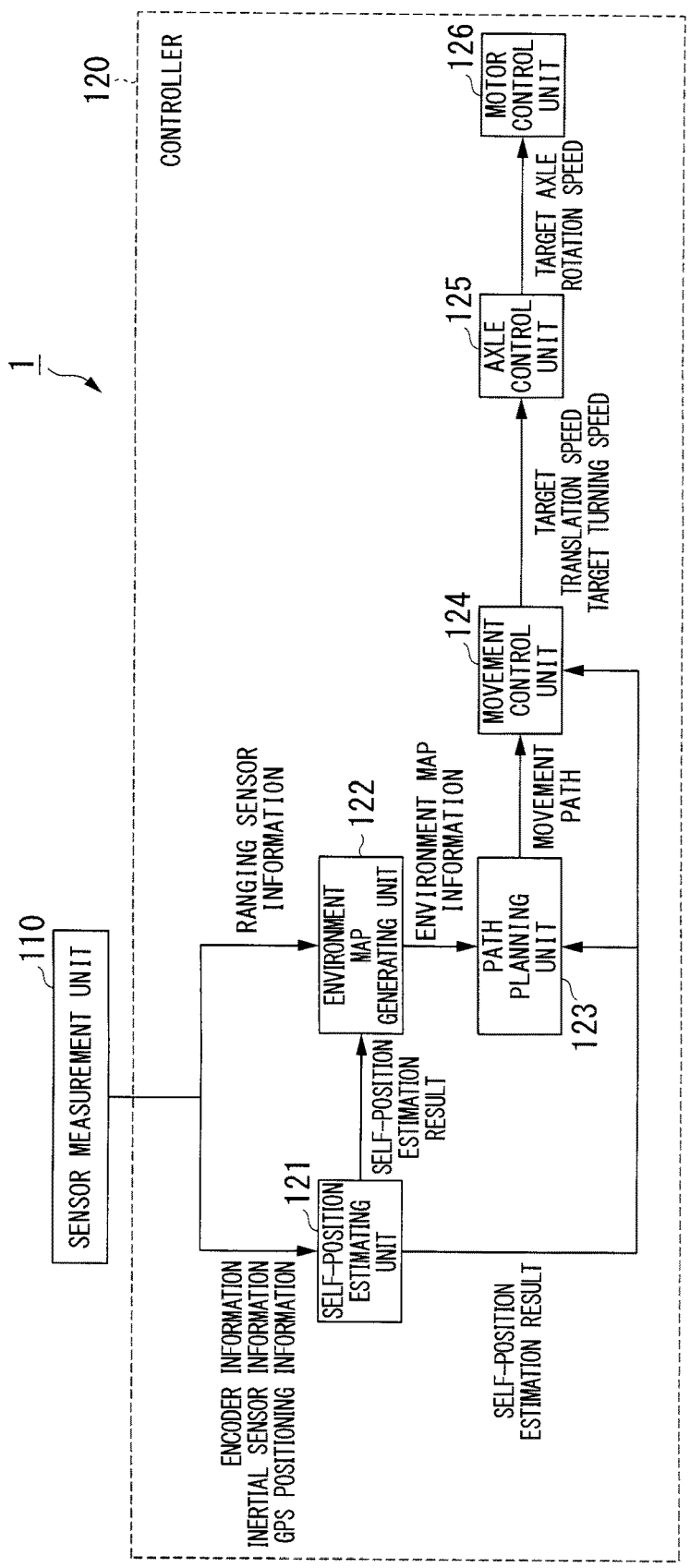
FIG. 2 is a schematic block diagram illustrating a functional configuration of a controller according to the first embodiment.

FIG. 2 is a schematic block diagram illustrating the functional configuration of the controller 120 according to the present embodiment. The controller 120 includes a self-position estimating unit 121, the environment map generating unit 122, a path planning unit 123, a movement control unit 124, an axle control unit 125, and a motor control unit 126. The controller 120 functions as an autonomous movement control device for controlling movement of the robot.

The self-position estimating unit 121 determines the position (self-position) of the robot on the basis of the motion state information input from the sensor measurement unit 110. One of encoder information, inertial sensor information, GPS positioning information, or a combination thereof is input as the motion state information.

The self-position estimating unit 121 has, for example, an odometer function. That is, the self-position estimating unit 121 calculates its own translation speed and turning speed from the rotation speed indicated by the encoder information input from the sensor measurement unit 110. The self-position estimating unit 121 performs time integration on the calculated translation speed and turning speed and calculates a position and a direction of the robot at a current time as odometer information.

If the inertial sensor information is input to the self-position estimating unit 121, the self-position estimating unit 121 may correct the position and the direction indicated by the odometer information on the basis of the acceleration and the direction indicated by the inertial sensor information.

The self-position estimating unit 121 may sequentially identify absolute positions indicated by the GPS positioning information. Consequently, measured absolute positions are acquired in real time. The GPS unit 113 is effective in an outdoor environment where GPS signals can be received, but GPS positioning information is not acquired in an indoor region or other facilities where the GPS signals do not reach. The self-position estimating unit 121 may determine the absolute position of the robot using another technique. For example, when the absolute position is determined, the self-position estimating unit 121 matches the environment map information generated by the environment map generating unit 122 and the ranging sensor information input from the sensor measurement unit 110 at a current time. The self-position estimating unit 121 outputs the determined position as a self-position estimation result to the environment map generating unit 122, the path planning unit 123, and the movement control unit 124.

The environment map generating unit 122 generates the environment map information on the basis of the ranging sensor information input from the sensor measurement unit 110. For example, the environment map generating unit 122 generates a grid map as the environment map information. The grid map is map information indicating existence information about the existence of a physical object at a position for each element space obtained by partitioning a two-dimensional space around the robot at regular intervals. In the following description, each element space is referred to as a grid. For example, an element space having a square shape is used as a grid obtained by partitioning the two-dimensional space (see FIG. 3).

The environment map generating unit 122 determines the existence of an obstacle at a position identified by a distance and a direction on the basis of the distance in each direction up to the obstacle indicated by the ranging sensor information. The environment map generating unit 122 determines the presence or absence of an obstacle for each grid on the basis of a position at which the existence of the obstacle is determined, and generates environment map information including the existence information about the determined presence/absence. Here, the environment map generating unit 122 determines that there is an obstacle in a grid related to the position or a position which has a longer distance to the robot than the position. The environment map generating unit 122 determines that there is no obstacle for a grid related to a position which has a shorter distance to the robot than the position. On the basis of these determinations, the environment map generating unit 122 generates existence information indicating an existence accuracy of the obstacle. In the following description, information related to the nonexistence of the obstacle may be referred to as nonexistence information, and the nonexistence information is distinguished from information related to the existence of the obstacle. Also, the existence information indicating the existence accuracy is referred to as accuracy information.

The environment map generating unit 122 may convert a position indicated by a robot coordinate system into a position indicated by a world coordinate system with reference to the absolute position of the robot system 1 indicated by the self-position estimation result input from the self-position estimating unit 121. The robot coordinate system is a coordinate system indicating a position of each grid using the position of the robot system 1 as a reference. The world coordinate system is a coordinate system indicating the position of each grid with an absolute position. The environment map generating unit 122 stores the generated environment map information in the environment map storing unit 130. Also, every time the ranging sensor information and the self-position estimation result are input, the environment map generating unit 122 generates new environment map information on the basis of the input ranging sensor information and self-position estimation result. The environment map generating unit 122 identifies difference information between the newly generated environment map information and the existing environment map information stored in the environment map storing unit 130 and updates the environment map information stored in the environment map storing unit 130 with the identified difference information. The functional configuration of the environment map generating unit 122 will be described below.

The path planning unit 123 refers to the environment map information generated by the environment map generating unit 122 and performs path planning of the robot on the basis of the self-position estimation result input from the self-position estimating unit 121. The path planning includes a process of determining a movement path. For example, the path planning unit 123 determines that a movement path having a lowest movement cost is a movement path to a target spot using a position at a current time of the robot (a current position) indicated by the self-position estimation result as a departure spot. The current time includes a point in time at which the latest information was obtained. For example, the path planning unit 123 calculates a sum of cost element values in a provisional path based on existence accuracy of an obstacle for each grid indicated by the environment map information as a movement cost for each provisional path. Each of the provisional paths is represented by a plurality of grids spatially adjacent to each other sequentially from a grid of the departure spot to a grid of the target spot. The term "adjacent" includes not only a case in which grids are in contact with one side therebetween in a horizontal or vertical direction but also a case in which the grids are in contact with one vertex therebetween in a diagonal direction. A larger value is set as the cost element value for each grid when the existence accuracy of the obstacle is higher. Also, it is only necessary to set the cost element value so that movement costs for grids with the same cost element value increase as the number of grids included in one path increases. If a range of one existence accuracy value is predetermined, for example, a difference of a predetermined offset value from the existence accuracy is used as the cost element value. It is only necessary for the offset value to be a real value smaller than a minimum value of the existence accuracy. Then, the path planning unit 123 determines that a provisional path with the smallest calculated movement cost is the movement path. For example, the path planning unit 123 uses a path search method such as an A* algorithm when the movement path is determined. For example, the path planning unit 123 may identify a target position specified by an external input signal received from an operation input unit (not illustrated) that receives an operation from a user. Also, the path planning unit 123 may use predetermined artificial intelligence (AI) technology to identify a position a predetermined time after a current time at which an action of the robot is determined as a target position. The path planning unit 123 outputs movement path information indicating the determined movement path to the movement control unit 124.

The movement control unit 124 controls movement of the robot on the basis of the movement path information input from the path planning unit 123 and the self-position estimation result input from the self-position estimating unit 121. The movement control unit 124 determines a target speed at each point in time from the current position indicated by the self-position estimation result until the robot reaches the target position in the movement path indicated by the movement path information. The movement control unit 124 determines that a target translation speed and a target turning speed is the target speed. The target translation speed is a command value of a speed of the robot in a forward direction (a translation speed). The target turning speed is a command value of a speed of the robot in a side direction (a turning speed). The side direction is, for example, one direction of a straight line passing through the axle of each of the two wheels. The forward direction is a direction orthogonal to the straight line and parallel to a main surface of a carriage of the robot. Accordingly, a ratio between the target translation speed and the target turning speed corresponds to a target direction at a current time, and a square root of a sum of squares of the target translation speed and the target turning speed indicates an absolute value of the target speed at the current time. For example, the movement control unit 124 determines the target translation speed and the target turning speed so that the absolute value of the target speed is maintained at a predetermined constant target speed. The movement control unit 124 outputs information about the determined target translation speed and target turning speed to the axle control unit 125. An example of movement control of the robot based on the environment map information will be described below.

The axle control unit 125 determines a target axle rotation speed for each of the left and right wheels at the current time on the basis of the target translation speed and the target turning speed input from the movement control unit 124. The target axle rotation speed is a target value of the rotation speed of each of the axles. The axle control unit 125 can calculate the target axle rotation speed for each of the left and right wheels using the target translation speed, the target turning speed, a distance between the wheels, and a radius of each of the wheels. The axle control unit 125 outputs the calculated left and right target axle rotation speeds to the motor control unit 126.

The motor control unit 126 controls rotation speeds of the left wheel motor 141 and the right wheel motor 142 so that the axle of the left wheel and the axle of the right wheel are rotated at the left and right target axle rotation speeds input from the axle control unit 125. For example, the motor control unit 126 performs feedback control of power values of power supplied to the left wheel motor 141 and the right wheel motor 142 for each predetermined control cycle so that the rotation speeds of the left wheel and the right wheel approach the left and right target axle rotation speeds.

Here, a sensor for detecting the rotation speed of each of the left wheel and the right wheel is provided in the driving unit 140. For example, when power values are determined, a feedback algorithm such as PID control can be used. The motor control unit 126 supplies power corresponding to the determined power values to the left wheel motor 141 and the right wheel motor 142.

Example of First Map Information

Figure 3:
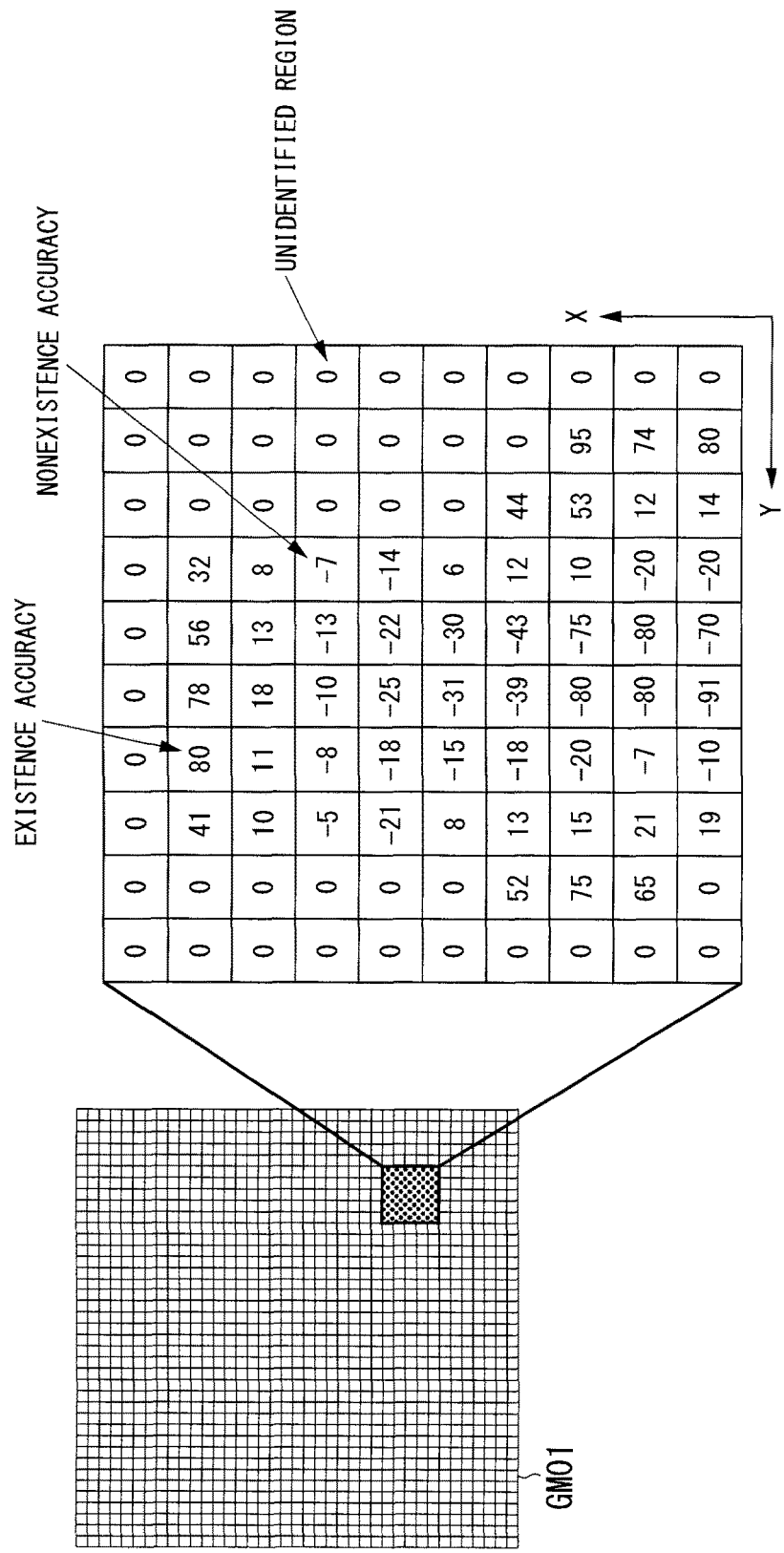
FIG. 3 is a diagram illustrating a grid map as an example of first map information according to the first embodiment.

Next, the first map information, which is one type of environment map information, according to the present embodiment will be described. The first map information is map information generated on the basis of ranging sensor information. FIG. 3 is a diagram illustrating a grid map GM01 as an example of the first map information according to the present embodiment. The grid map GM01 indicates existence accuracy of an obstacle in a space corresponding to a grid for each grid. Each of the grids is a grid of square spaces partitioned at regular intervals in an X direction (the vertical direction) and a Y direction (the horizontal direction) in a two-dimensional space around the robot. The X direction and the Y direction are parallel to a horizontal plane and are orthogonal to each other. In the example illustrated in FIG. 3, certainty of existence of an obstacle for each grid is indicated by a positive value and certainty of nonexistence of an existence object is indicated by a negative value as existence accuracy of a grid. A negative value is referred to as nonexistence accuracy and is distinguished from the existence accuracy indicated by a positive value. A region including a grid in which a positive value is set as the existence accuracy and a region including a grid in which a negative value is set as the existence accuracy correspond to the existence region and the nonexistence region, respectively. Values of the existence accuracy and the nonexistence accuracy are indicated such that a higher degree of certainty is given for a greater the absolute value of each. A grid in which a value of 0 is set as the existence accuracy indicates an unidentified region in which neither the existence nor the nonexistence of an obstacle can be identified.

Figure 4:
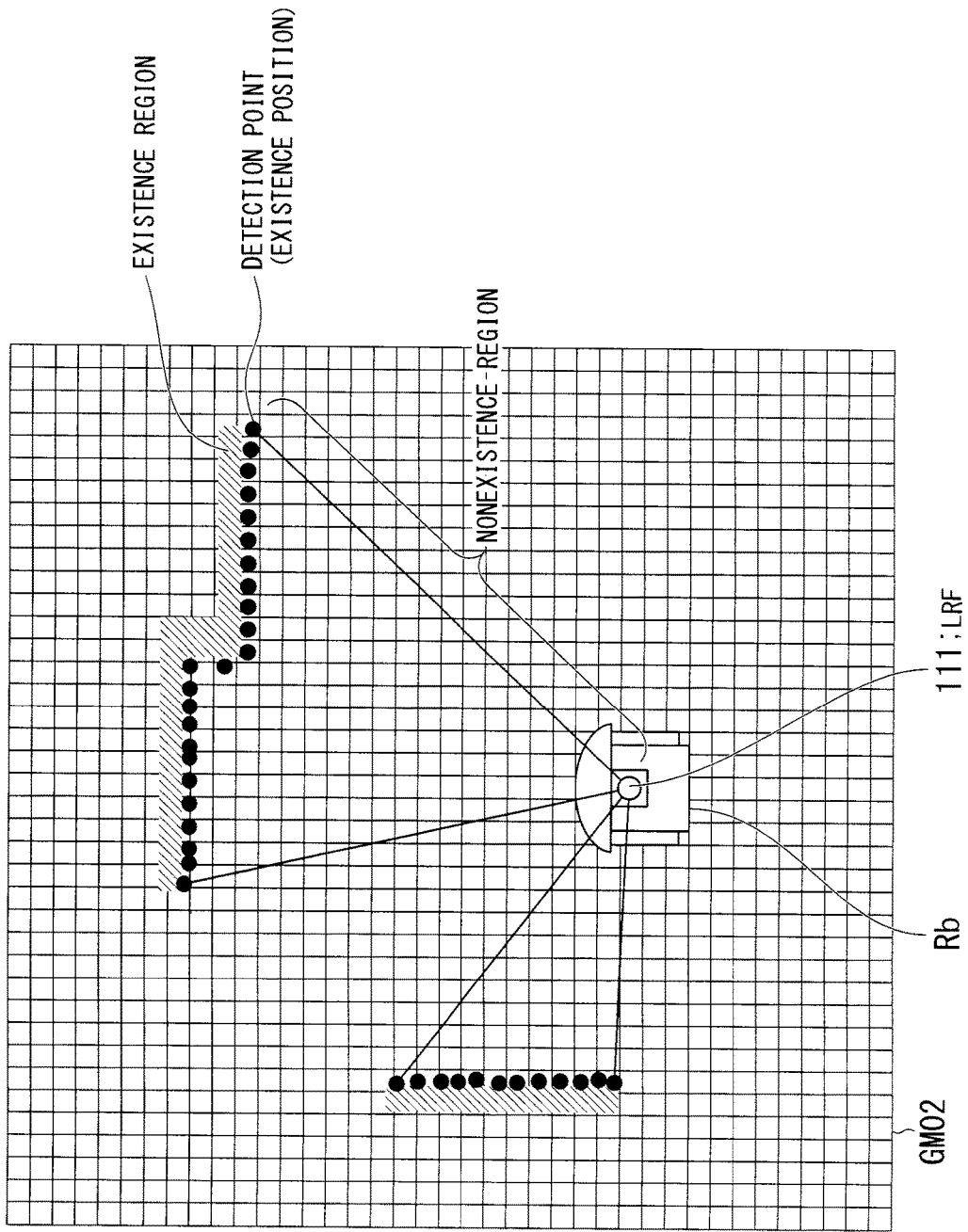
FIG. 4 is an explanatory diagram illustrating a method of generating a grid map.

Next, a technique of generating a grid map GM02 as an example of the first map information will be described. FIG. 4 is an explanatory diagram illustrating the technique of generating the grid map GM02.

A first map generating unit 1221 (described below) of the environment map generating unit 122 generates the grid map GM02 using, for example, an algorithm such as SLAM. The first map generating unit 1221 identifies a detection point indicated by a distance to the obstacle in each direction indicated by the ranging sensor information input from the LRF 114 as an existence position of the obstacle. For example, the first map generating unit 1221 identifies a grid included in a region which has a distance from the robot that is greater than or equal to the distance from the robot to the detection point as a grid belonging to an existence region in which the obstacle exists. The first map generating unit 1221 identifies a grid included in a region having a distance from the robot less than the distance from the robot to the detection point as a grid belonging to the nonexistence region in which the obstacle does not exist. A region including a grid distributed in a direction in which no obstacle is detected corresponds to an unidentified region. The first map generating unit 1221 presets 0 as an initial value of the existence accuracy of each grid. The first map generating unit 1221 determines the existence accuracy on the basis of a predetermined conversion rule. For example, the first map generating unit 1221 determines the existence accuracy so that an absolute value thereof is large for a grid indicating a position having a short distance from a point of the center of gravity of the robot. That is, the first map generating unit 1221 sets the existence accuracy to a small value for a grid related to a position having a long distance from the point of the center of gravity of the robot in the existence region, and sets the nonexistence accuracy to a large value (sets the absolute value to a low value) for a grid related to a position having a long distance from the point of the center of gravity of the robot in the nonexistence region. The accuracy information set for each grid can be overwritten (reset and updated). If the absolute value of the newly set existence or nonexistence accuracy is larger than a predetermined threshold value, the newly set existence or nonexistence accuracy is assumed to overwrite the value of the existence or nonexistence accuracy. The threshold value and the condition are referred to as an overwriting threshold value and an overwriting condition, respectively.

FIGS. 3 and 4 illustrate examples of a two-dimensional grid map, but the present invention is not limited thereto. The first map generating unit 1221 may generate a three-dimensional grid map as the first map information. In the three-dimensional grid map, existence information indicating the existence of an obstacle is set for each of three-dimensional grids segmented at regular intervals in the X direction, the Y direction, and a Z direction (a height direction) in a three-dimensional space around the robot. For example, a shape of each grid is a cube.

In this case, the sensor measurement unit 110 may detect a distance to a physical object in each direction of the three-dimensional space including the height direction in addition to a horizontal plane. For example, the sensor measurement unit 110 may include a plurality of LRFs 114 having different heights from each other or may include a movable unit (not illustrated) on which one LRF 114 is mounted and which changes its height. The first map generating unit 1221 generates a three-dimensional grid map by integrating two-dimensional grid maps generated for heights between a plurality of heights. Also, in the LRF 114, a radiation direction of the laser beam is not limited to being within the horizontal plane, and may be variable in an elevation direction using the horizontal plane as a reference. When a position of an obstacle is identified, the first map generating unit 1221 can identify the position of the obstacle in the three-dimensional space on the basis of a set of an azimuth angle and an elevation angle on the horizontal plane and a distance to the detected obstacle for the set. On the basis of the identified position of the obstacle, the first map generating unit 1221 can determine an existence accuracy of the obstacle for each grid according to the above-described technique.

The sensor measurement unit 110 may be provided with another sensor device as a ranging unit for acquiring the ranging sensor information instead of the LRF 114 or together with the LRF 114. The other sensor device is, for example, an ultrasonic sensor. The ultrasonic sensor is a sensor device that measures a distance to an obstacle as the ranging sensor information on the basis of a phase difference between an ultrasonic wave radiated by the ultrasonic sensor and a reflected wave reflected by a surface of the obstacle. The other sensor device may be, for example, an optical camera. The optical camera captures an image arranged in a three-dimensional space, acquires a captured image of an obstacle and depth information of the obstacle as the ranging sensor information. For example, an algorithm such as visual SLAM can be used as a technique of generating an environment map on the basis of the position of the obstacle indicated by the image captured by the optical camera.

The first map generating unit 1221 may determine existence accuracy for each grid on the basis of the ranging sensor information acquired by each ranging unit and integrate the determined existence accuracy with the ranging sensor information of each of the ranging units. When the existence accuracy is determined, the first map generating unit 1221 determines existence accuracy having a large absolute value for the ranging unit related to a technique with high measurement accuracy of a direction of the object. For example, the first map generating unit 1221 determines the existence accuracy so that an absolute value of the existence accuracy based on the ranging sensor information acquired by the LRF 114 is larger than an absolute value of the existence accuracy based on the ranging sensor information acquired by the ultrasonic sensor. Generally, because the laser beam emitted by the LRF 114 has higher directivity and higher intensity in a received reflected wave than the ultrasonic wave radiated by the ultrasonic sensor, the existence of an obstacle that reflects the laser beam is more reliably identified. Also, because the intensity of the laser beam is less dependent on the distance to the obstacle, the first map generating unit 1221 may set dependence on distance of the existence accuracy based on the ranging sensor information acquired by the LRF 114 so that the dependence is lower than the ranging sensor information acquired by the ultrasonic sensor. Here, the dependence on distance indicates that a smaller absolute value is given for a larger distance. On the other hand, because the directivity of the ultrasonic waves radiated by the ultrasonic sensor is lower than the directivity of the laser beam, position information of the obstacle is detected to be wider than position information of the LRF 114, but distance attenuation of the reflected wave intensity is significant. Therefore, the first map generating unit 1221 sets the existence accuracy based on the ranging sensor information acquired by the ultrasonic sensor so that the dependence on distance is higher than that of the ranging sensor information acquired by the LRF 114.

Also, the ranging unit may output the ranging sensor information including intensity of the reflected wave in each direction to the first map generating unit 1221, and the first map generating unit 1221 may further determine the existence accuracy on the basis of the intensity. For example, the first map generating unit 1221 identifies a maximum value of the absolute value of the existence accuracy between the ranging units for each grid using an algorithm when the existence accuracy is integrated. The first map generating unit 1221 generates first map information including existence accuracy to which the identified maximum value is assigned for each grid.

(Environment Map Generation Unit)

Figure 5:
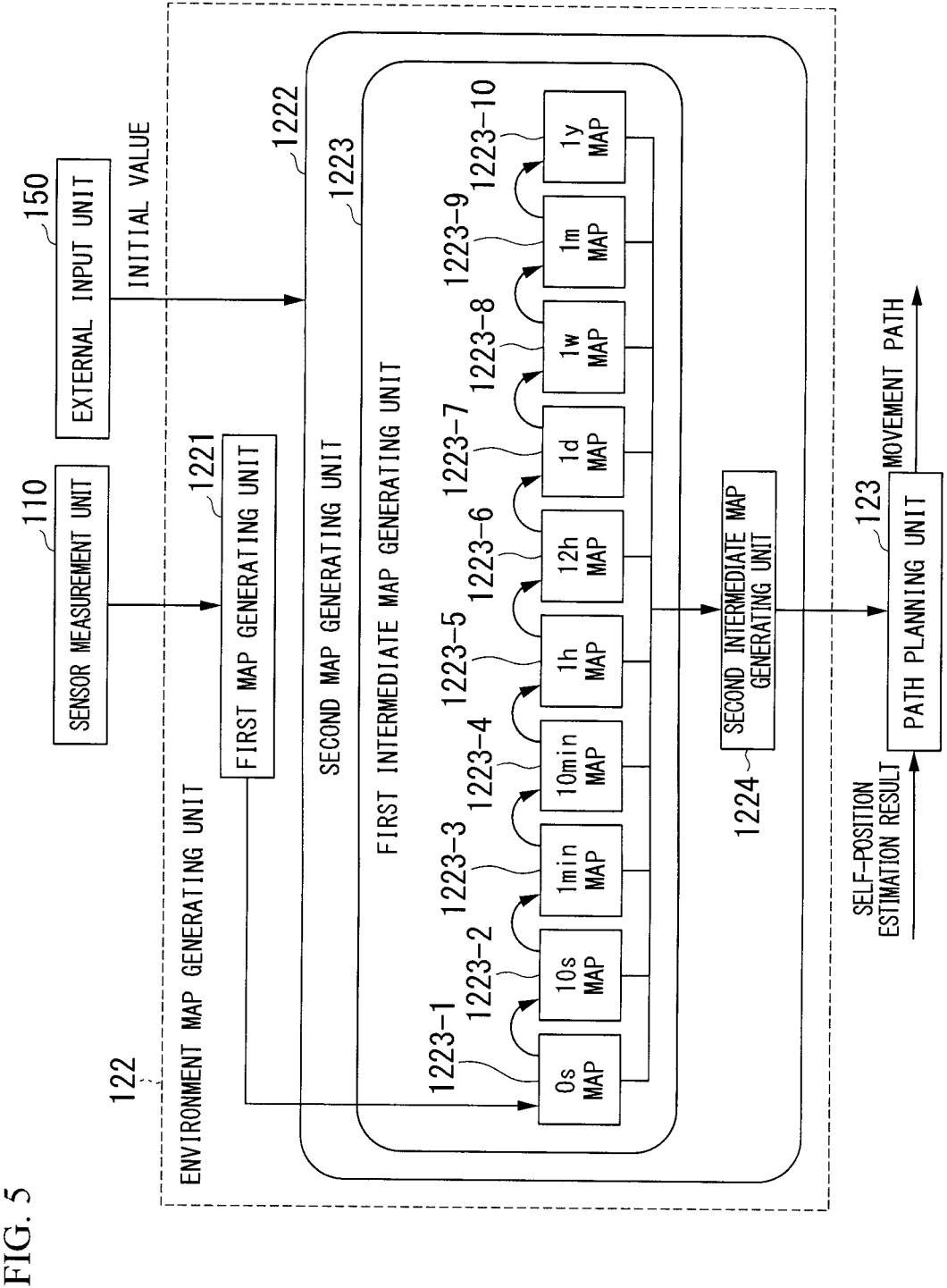
FIG. 5 is a schematic block diagram illustrating a functional configuration of an environment map generating unit according to the first embodiment.

Next, the functional configuration of the environment map generating unit 122 according to the present embodiment will be described. FIG. 5 is a schematic block diagram illustrating the functional configuration of the environment map generating unit 122 according to the present embodiment.

The environment map generating unit 122 includes the first map generating unit 1221 and a second map generating unit 1222.

The first map generating unit 1221 receives the ranging sensor information from the sensor measurement unit 110 and the self-position estimation result from the self-position estimating unit 121 (FIG. 2) for each predetermined sampling period. As described above, the first map generating unit 1221 sequentially generates the first map information on the basis of the ranging sensor information and the self-position estimation result. The first map generating unit 1221 outputs the generated first map information to the second map generating unit 1222.

The second map generating unit 1222 includes a first intermediate map generating unit 1223 and a second intermediate map generating unit 1224.

The first intermediate map generating unit 1223 includes a plurality of stored map generating units. The stored map generating unit generates a stored map as first intermediate map information, which is one form of the environment map information. In the example illustrated in FIG. 5, the number of stored map generating units is ten. In the following description, this number is referred to as the number of stages. The ten stored map generating units are referred to as first to tenth stored map generating units 1223-1 to 1223-10 to distinguish the stored map generating units from one another. A predetermined description permission time is set in each of the first to tenth stored map generating units 1223-1 to 1223-10. The description permission time is a threshold value of a time during which a description of accuracy information related to an obstacle is permitted when an existence period during which the obstacle exists or a nonexistence period during which the obstacle does not exist with respect to the map information input to its own unit is long to be greater than or equal to the description permission time. Description permission times set in the first to tenth stored map generating units 1223-1 to 1223-10 are set in ascending order. In the example illustrated in FIG. 5, the description permission times of the first to tenth stored map generating units 1223-1 to 1223-10 are 0 seconds, 10 seconds, 1 minute, 10 minutes, 1 hour, 12 hours, 1 day, 1 week, 1 month, and 1 year. Also, a description permission time set in an $n^{th}$ stored map generating unit 1223-$n$ (n is an integer greater than or equal to 1) is referred to as an $n^{th}$ time threshold value, and the stored map information generated by the $n^{th}$ stored map generating unit 1223-$n$ may be referred to as $n^{th}$ stored map information. The first to tenth stored maps correspond to a 0 s map, a 10 s map, a 1 min map, a 10 min map, a 1 h map, a 12 h map, a 1 d map, a 1 w map, a 1 m map, and a 1 y map illustrated in FIG. 5.

The first to tenth stored map generating units 1223-1 to 1223-10 update accuracy information of a grid of a stored map of a previous stage to accuracy information of a grid of a stored map in which the description is permitted. Map information including the updated accuracy information is formed as stored map information.

When the stored map information is generated, the first to tenth stored map generating units 1223-1 to 1223-10 set an initial value of existence accuracy indicated by accuracy information in each grid to 0. In each piece of the first map information and the stored map information, accuracy information for each grid of a static obstacle in an environment around the robot may be preset via the external input unit 150 as prior information. The prior information may be, for example, CAD data generated by computer aided design (CAD) technology. The external input unit 150 is, for example, an input/output interface provided in the robot system 1 (FIG. 1).

To determine a period during which the obstacle exists, the first to tenth stored map generating units 1223-1 to 1223-10 further include clock time information indicating a clock time at which an update is performed in the stored map information with respect to a grid of which accuracy information is updated. A size of a space indicated by the stored map information is equal to a size of a space indicated by the first map information.

The first map information is input from the first map generating unit 1221 to the first stored map generating unit 1223-1 having a shortest description permission time. The first map generating unit 1221 adopts the input first map information as first stored map information and outputs the first stored map information to the second stored map generating unit 1223-2 and the second intermediate map generating unit 1224. The second to tenth stored map generating units 1223-2 to 1223-10 detect a grid in which an existence state of an obstacle changed on the basis of the accuracy information input from the first to ninth stored map generating units 1223-1 to 1223-9 and records clock time information indicating a clock time at which the existence state changed for the grid in association with the accuracy information. The second to ninth stored map generating units 1223-2 to 1223-9 refer to the clock time information and output accuracy information related to a grid for the grid in which it is determined that a time during which the existence state of the obstacle is constant is greater than or equal to the second to ninth time threshold values to the third to tenth stored map generating units 1223-3 to 1223-10, and output second to ninth map information including the accuracy information to the second intermediate map generating unit 1224. The tenth stored map generating unit 1223-10 outputs tenth stored map information including accuracy information related to a grid to the second intermediate map generating unit 1224 when a time during which the existence state of the obstacle of each grid is constant is greater than or equal to the tenth time threshold value.

Consequently, the 0 s map has all of the accuracy information of the first map information. The 10 s map, the 1 min map, the 10 min map, the 1 h map, the 12 h map, the 1 d map, the 1 w map, the 1 m map, and the 1 y map have accuracy information indicating obstacles having existence times of 10 seconds, 1 minute, 10 minutes, 1 hour, 12 hours, 1 day, 1 week, 1 month, and 1 year, or more, respectively.

Figure 6:
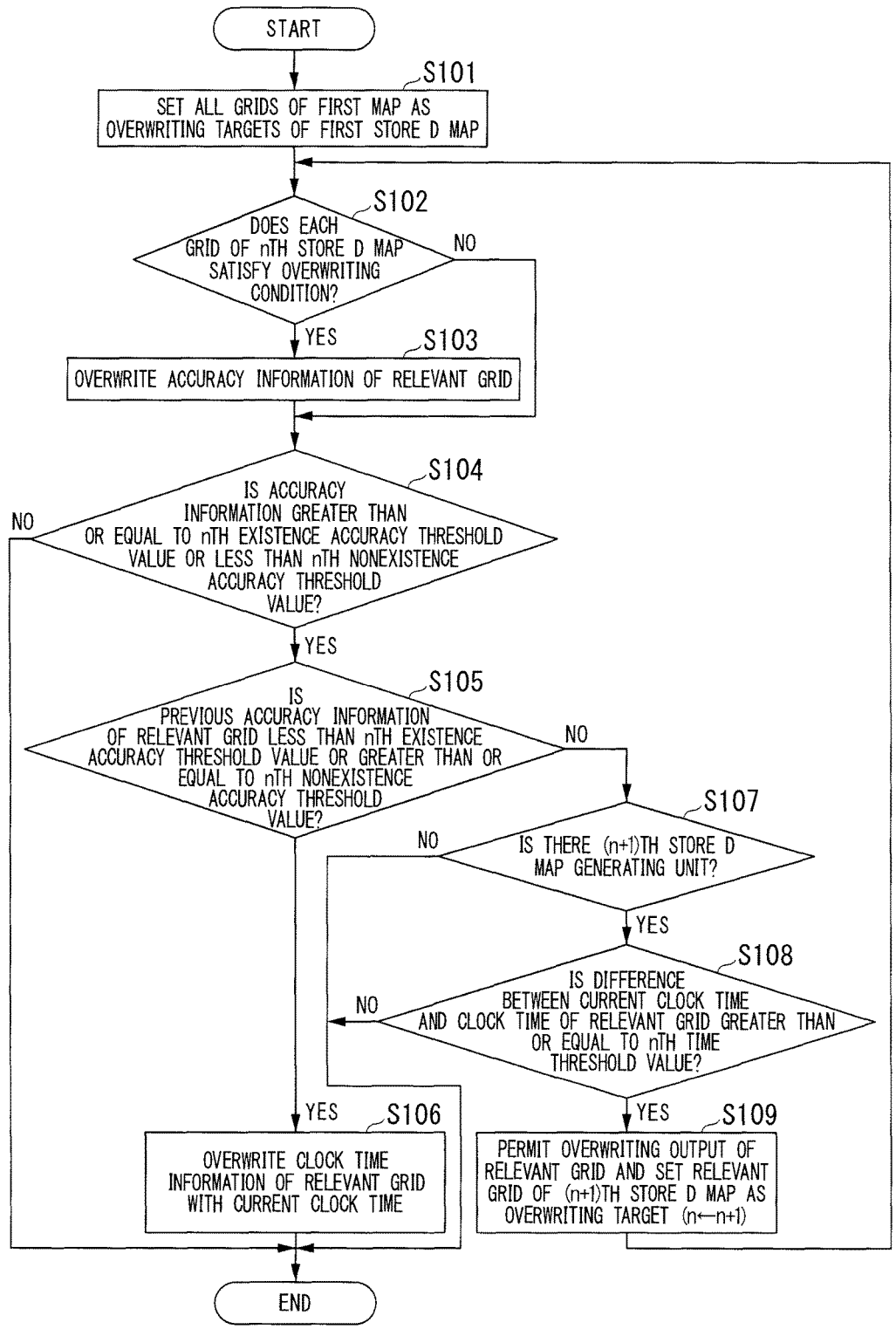
FIG. 6 is a flowchart illustrating a process of generating stored map information according to the first embodiment.

Next, a process of generating stored map information in the first intermediate map generating unit 1223 will be described. FIG. 6 is a flowchart illustrating a process of generating stored map information according to the present embodiment.

(Step S101) First map information is input from the first map generating unit 1221 to the first stored map generating unit 1223-1. The first stored map generating unit 1223-1 sets all accuracy information of grids included in the newly input first map information as an overwriting target and generates first stored map information including the accuracy information. That is, the input first map information is always equal to the first stored map information. The first stored map generating unit 1223-1 outputs the generated first stored map information to the second intermediate map generating unit 1224 and the second stored map generating unit 1223-2. Thereafter, the process proceeds to step S102. In step S102, n is 2.

(Step S102) The $n^{th}$ stored map generating unit 1223-$n$ determines whether or not accuracy information included in input $(n-1)^{th}$ stored map information satisfies an overwriting condition for each of the grids. For a grid determined to satisfy the overwriting condition (step S102; YES), the process proceeds to step S103. For a grid determined not to satisfy the overwriting condition (step S102; NO), the process proceeds to step S104.

(Step S103) The $n^{th}$ stored map generating unit 1223-$n$ overwrites accuracy information related to a grid among the accuracy information included in the $(n-1)^{th}$ stored map information to a memory (not illustrated) provided in the $n^{th}$ stored map generating unit 1223-$n$. In the memory, $n^{th}$ stored map information is formed. Thereafter, the process proceeds to step S104.

(Step S104) The $n^{th}$ stored map generating unit 1223-$n$ determines whether or not existence accuracy indicated by accuracy information of a grid overwritten at a current time is greater than or equal to an $n^{th}$ existence accuracy threshold value or is less than the $n^{th}$ nonexistence accuracy threshold value. The $n^{th}$ existence accuracy threshold value is a threshold value which the $n^{th}$ stored map generating unit 1223-$n$ uses to determine the existence of an obstacle when the existence accuracy indicated by the reliability information is greater than or equal to the threshold value. The $n^{th}$ nonexistence accuracy threshold value is a threshold value which the $n^{th}$ stored map generating unit 1223-$n$ uses to determine the nonexistence of an obstacle when the existence accuracy indicated by the accuracy information is less than the threshold value. That is, the existence or nonexistence of the obstacle in the grid is determined. For a grid whose existence accuracy is determined to be greater than or equal to the $n^{th}$ existence accuracy threshold value or less than the $n^{th}$ nonexistence accuracy threshold value (step S104 YES), the process proceeds to step S105. For the grid whose existence accuracy is determined to be neither greater than or equal to the $n^{th}$ existence accuracy threshold value nor less than the $n^{th}$ nonexistence accuracy threshold value (step S104 NO), the process illustrated in FIG. 4 is terminated.

(Step S105) The $n^{th}$ stored map generating unit 1223-$n$ determines whether or not existence accuracy indicated by accuracy information related to previous overwriting is less than the $n^{th}$ existence accuracy threshold value if existence accuracy indicated by accuracy information of a grid overwritten at a current time is greater than or equal to the $n^{th}$ existence accuracy threshold value or determines whether or not existence accuracy indicated by accuracy information related to a previous overwriting is greater than or equal to the $n^{th}$ nonexistence accuracy threshold value if the existence accuracy indicated by the accuracy information of the grid overwritten at the current time is less than the $n^{th}$ nonexistence accuracy threshold value. Therefore, according to the present step, with respect to the grid, either (1) a change from a state in which the existence of the obstacle is not confirmed at a previous time to a state in which the existence of the obstacle is determined at a current time or (2) a change from a state in which the existence of the obstacle is confirmed at a previous time to a state in which the nonexistence of the obstacle is determined at the current time is determined. Then, (1) the change from the state in which the existence of the obstacle is not confirmed at the previous time to the state in which the existence of the obstacle is determined at the current time includes (1-1) a change from a state in which the nonexistence of the obstacle is determined at the previous time to the state in which the existence of the obstacle is determined at the current time and (1-2) a change from a state in which the existence or nonexistence of the obstacle is not confirmed to the state in which the existence of the obstacle is determined at the current time. (2) The change from the state in which the existence of the obstacle is not confirmed at the previous time to the state in which the nonexistence of the obstacle is determined at the current time includes (2-1) a change from a state in which the obstacle existed at the previous time to the state in which the nonexistence of the obstacle is determined at the current time and (2-2) a change from the state in which the existence or nonexistence of the obstacle is not confirmed at the previous time to the state in which the nonexistence of the obstacle is determined at the current time. In other words, it is determined whether or not the state of the existence/nonexistence of the obstacle in the grid changed between the previous time and the current time. If it is determined that the previous existence accuracy is less than the $n^{th}$ existence accuracy threshold value or is greater than or equal to the $n^{th}$ nonexistence accuracy threshold value (step S105; YES), the process proceeds to step S106. If it is determined that the previous existence accuracy is neither less than the $n^{th}$ existence accuracy threshold value nor greater than or equal to the $n^{th}$ nonexistence accuracy threshold value (step S105; NO), the process proceeds to step S107.

(Step S106) The $n^{th}$ stored map generating unit 1223-$n$ overwrites clock time information indicating a clock time at the current time (a current clock time) for the grid on the memory in association with the accuracy information of the grid. Thereby, clock time information indicating an updated clock time at which the existence/nonexistence state of the obstacle changed is recorded.

Thereafter, the process illustrated in FIG. 6 is terminated.

(Step S107) When an $(n+1)^{th}$ stored map generating unit 1223-$n$+1 exists, that is, when n reaches the number of stages N (step S107; YES), the process proceeds to the processing of step S108. When the $(n+1)^{th}$ stored map generating unit 1223-$n$+1 does not exist (step S107; NO), the process illustrated in FIG. 6 is terminated.

(Step S108) The $n^{th}$ stored map generating unit 1223-$n$ identifies a difference between an updated clock time indicated by clock time information of a grid and the current clock time as a duration time with respect to the grid whose existence accuracy is greater than or equal to the $n^{th}$ existence accuracy threshold value or less than the $n^{th}$ nonexistence accuracy threshold value and whose accuracy information is not overwritten. That is, with respect to the grid of which a state in which the existence accuracy is greater than or equal to the $n^{th}$ existence accuracy threshold value or less than the $n^{th}$ nonexistence accuracy threshold value is continuous, a duration time during which the state of existence or nonexistence of the obstacle is constant is identified. The $n^{th}$ stored map generating unit 1223-$n$ determines whether or not the duration time for the corresponding grid is greater than or equal to the $n^{th}$ time threshold value. For a grid having a duration time determined to be greater than or equal to the $n^{th}$ time threshold value (step S108; YES), the process proceeds to step S109. For a grid having a duration time determined to be less than the $n^{th}$ time threshold value (step S109; NO), the process illustrated in FIG. 6 is terminated.

(Step S109) The $n^{th}$ stored map generating unit 1223-$n$ permits an overwriting output of accuracy information for a relevant grid and outputs the accuracy information to the $(n+1)^{th}$ stored map generating unit 1223-$n$+1. The output accuracy information serves as an overwriting target of $(n+1)^{th}$ stored map information in the $(n+1)^{th}$ stored map generating unit 1223-$n$. At this stage, n+1 is updated as a new n. Also, the $n^{th}$ stored map generating unit 1223-$n$ overwrites accuracy information of an output target on the memory and outputs the $n^{th}$ stored map information formed by accumulating the accuracy information through overwriting to the second intermediate map generating unit 1224. Thereafter, the process proceeds to step S102.

Also, the second to tenth existence accuracy threshold values may be equal to one another or different values. The second to tenth existence accuracy threshold values may be equal to or different from the overwriting threshold value. The second to tenth nonexistence accuracy threshold values may be the same value or different values. The second to tenth nonexistence accuracy threshold values may be equal to or different from a value obtained by determining whether the overwriting threshold value is positive or negative.

The $n^{th}$ time threshold value, that is, the description permission time, is not limited to the above-described example. Also, the number of stages is not limited to 10, and may be 2 or more.

In this way, stored map information in which a period during which the existence state of the obstacle is maintained up to the current time is greater than or equal to the $n^{th}$ time threshold value is obtained from the $n^{th}$ stored map generating unit 1223-$n$. For example, accuracy information related to static obstacles with low possibility of movement, such as walls and piping of buildings, passers-by, and temporarily placed packages, is described in a stored map with a long description permission time, and accuracy information related to dynamic obstacles whose arrangements are changed, such as temporary signboards, is described in a stored map with a short description permission time. Accordingly, the $n^{th}$ stored map information having the short description permission time generated by the $n^{th}$ stored map generating unit 1223-$n$ also includes an existence state of an obstacle indicated by $m^{th}$ stored map information generated by a stored map generating unit 1223-*m* (m is an integer greater than n) related to a description permission time longer than that of the n$^{th}$ stored map information. Thus, by taking difference information of stored map information related to a shorter description permission time 1 from stored map information related to a longer description permission time 2, information indicating an existence state of the obstacle during a period from the shorter description permission time 1 to the longer description permission time 2 is obtained during a period during which the existence state is maintained up to the current time.

The second intermediate map generating unit 1224 generates one or more pieces of second intermediate map information related to the duration time according to usage of a movement path. The generated second intermediate map information indicates a distribution of existence states of an obstacle in which the existence state is maintained up to the current time. The second intermediate map generating unit 1224 selects any one or more predetermined stored maps from stored map information input from the first intermediate map generating unit 1223. If the number of selected stored maps is one, the second intermediate map generating unit 1224 determines that the selected stored map is the second intermediate map information. If the number of selected stored maps is two or more, the second intermediate map generating unit 1224 integrates the selected stored maps and generates an integrated map obtained through integration as the second intermediate map information. The second intermediate map generating unit 1224 may acquire a plurality of types of second intermediate map information. The second intermediate map generating unit 1224 should be preset the types and number of stored maps used for acquiring the second intermediate map information, and the types and numbers of stored maps may be preset according to the usage of the movement path generated by the path planning unit 123. The second intermediate map generating unit 1224 outputs the generated second intermediate map information to the path planning unit 123.

Next, an example of a movement path generated with the second intermediate map information will be described.

In one example, the second intermediate map generating unit 1224 generates, as an example of the stored map related to the description permission time which is greater than or equal to a predetermined first period, a first type of second intermediate map information by integrating the 1 m map and the 1 y map. When the stored maps are integrated (a second integration algorithm), the second intermediate map generating unit 1224 compares accuracy information included in the 1 m map and the 1 y map for each grid and identifies accuracy information in which the absolute value of the existence accuracy is the maximum value. Then, the second intermediate map generating unit 1224 generates the first type of second intermediate map information (long-period second intermediate map information) which includes the accuracy information identified for each of the grids. Consequently, the first type of second intermediate map information indicates a distribution of obstacles that continuously existed for one or more months. Such obstacles can be regarded as static obstacles such as various buildings and structures. Therefore, the path planning unit 123 refers to the second intermediate map information for a long period to determine a first movement path from a current position to a target position. The determined first movement path indicates a global movement path which is not affected by passers-by or other dynamic obstacles.

Then, the second intermediate map generating unit 1224 may generate, as an example of a stored map related to a description permission time which is greater than or equal to a predetermined threshold value of a second period and shorter than a threshold value of the first period, a first type of temporary second intermediate map information by integrating the 1 h map, the 12 h map, the 1 d map, and the 1 w map. Here, the second intermediate map generating unit 1224 compares accuracy information included in the 1 h map, the 12 h map, the 1 d map, and the 1 w map for each grid, and identifies accuracy information in which an absolute value of the existence accuracy is maximized. Then, the second intermediate map generating unit 1224 generates a first type of temporary second intermediate map information including the accuracy information identified for each of the grids. The second intermediate map generating unit 1224 generates, as accuracy information included in the first type of temporary second intermediate map information from the accuracy information included in the generated first type of temporary second intermediate map information, a second type of second intermediate map information (medium-period second intermediate map information) obtained by excluding a portion of a grid related to accuracy information in which the absolute value of the existence accuracy is greater than or equal to the predetermined threshold value. Consequently, the second type of second intermediate map information indicates a distribution of obstacles continuously existing for one or more hours but less than one month. That is, information indicating the existence of static obstacles of structures continuously existing for one or more months among the obstacles continuously existing for one or more hours is excluded.

The path planning unit 123 determines the presence or absence of interference with the obstacle indicated by the second type of second intermediate map information in the first movement path, that is, the presence or absence of a section in which there is the obstacle indicated by the second type of second intermediate map information in the first movement path (hereinafter referred to as an obstacle section). Specifically, the path planning unit 123 determines the presence or absence of a grid existing on the first movement path as a grid in which the existence accuracy indicated by the accuracy information included in the second type of second intermediate map information is greater than or equal to a predetermined positive threshold value.

When it is determined that interference occurs, the path planning unit 123 generates a path that avoids the obstacle section from the first movement path as a second movement path with reference to the second type of intermediate map information. More specifically, the path planning unit 123 determines that a spot a predetermined distance closer to a current position rather than a spot closest to the current position in the obstacle section and a spot the predetermined distance closer to a target position rather than a spot closest to the target position are a starting point and an ending point of an avoidance path. The path planning unit 123 generates the avoidance path from the determined starting point to the determined ending point with reference to the second type of second intermediate map information. The path planning unit 123 determines that a path including a section between a departure spot and the starting point of the avoidance path in the first movement path, the generated avoidance path, and a section from the ending point of the avoidance path in the first movement path to the target position is the second movement path. The path planning unit 123 outputs the determined second movement path to the movement control unit 124.

Also, because the avoidance path is longer than traveling in a section from the starting point to the ending point on the first movement path, a handy avoidance path may not exist. The path planning unit 123 can determine that such a case occurs, for example, when a scaling factor for the travel in the section from the starting point to the ending point of the avoidance path on the first movement path of traveling of the avoidance path is greater than or equal to a predetermined magnification greater than 1 (for example, ×1.2 to ×1.5). In the stored map information related to the second type of intermediate map information, there is a region in which an obstacle may exist in the 1 h map with a shortest description permission time and may not exist in other stored map information. In such a case, the path planning unit 123 may determine the movement path for moving the robot as the first movement path and output the first movement path to the movement control unit 124. Then, at a point in time before the current position reaches the starting point of the avoidance path, the path planning unit 123 determines the presence or absence of interference with the obstacle indicated by the second type of second intermediate map information at the point in time on the first movement path. When it is determined that interference does not occur, the path planning unit 123 does not update the first movement path. The robot continues to move on the first movement path. When it is determined that interference is present (or is not eliminated), the path planning unit 123 determines that a movement path for moving the robot is an avoidance path. At this time, the path planning unit 123 travels on the avoidance path. Because interference is expected to be eliminated early for obstacles with a short existence period, use of the avoidance path is avoided as much as possible and the first movement path with shorter travel is used as a travel path.

The second intermediate map generating unit 1224 may generate, as an example of a stored map related to a description permission time shorter than the predetermined threshold value of the first period in the above-described technique, a second type of temporary second intermediate map information by integrating the 0 s map, the 10 s map, the 1 min map, and the 10 min map.

On the other hand, the second intermediate map generating unit 1224 may generate, as an example of a stored map related to a description permission time that is greater than or equal to a predetermined threshold value of a third period, a third type of temporary second intermediate map information by integrating stored maps whose description permission times are 1 or more hours. The second intermediate map generating unit 1224 generates, as accuracy information included in the third type of temporary second intermediate map information from the second type of temporary second intermediate map information, a third type of second intermediate map information (short-period second intermediate map information) obtained by excluding a portion of a grid related to accuracy information which has an absolute value of existence accuracy greater than or equal to the predetermined threshold value. Consequently, the third type of second intermediate map information indicates a distribution of obstacles having an existence time of less than one hour. The third type of second intermediate map information indicates the existence of a short-period dynamic obstacle that remains in a place for a relatively short time, such as a passerby or a temporarily placed package.

The path planning unit 123 determines the presence or absence of interference with the obstacle indicated by the third type of second intermediate map information in the first movement path. Here, the path planning unit 123 determines the presence or absence of a grid existing on the first movement path as a grid in which existence accuracy indicated by the accuracy information included in the third type of second intermediate map information is greater than or equal to a predetermined positive threshold value. When it is determined that interference is occurring, the path planning unit 123 generates a path that bypasses the obstacle section from the first movement path as a third movement path in a technique similar to that of the second movement path with reference to the third type of intermediate map information. Here, the path planning unit 123 generates the avoidance path from the starting point to the ending point in a state in which the obstacle section is interposed between the points with reference to the third type of second intermediate map information. The path planning unit 123 determines that a path including a section between a current position and the starting point of the avoidance path in the first movement path, the generated avoidance path, and a section from the ending point of the avoidance path in the first movement path to the target position is the third movement path.

However, a short-period dynamic obstacle is likely to disappear from the obstacle section at a point in time at which the robot reaches the obstacle section. Therefore, the path planning unit 123 determines the movement path for moving the robot as the first movement path and outputs the first movement path to the movement control unit 124. Then, in a section before the current position reaches the starting point of the avoidance path, the path planning unit 123 determines the presence or absence of interference with the obstacle indicated by the third type of second intermediate map information at the point in time on the first movement path. When it is determined that interference does not occur, the path planning unit 123 does not update the first movement path. Consequently, the movement on the first movement path is continued. When it is determined that interference is occurring, the path planning unit 123 determines that a movement path for moving the robot is an avoidance path.

At this time, the path planning unit 123 travels on the avoidance path. In other words, the avoidance path based on the third type of second intermediate map information is different from the avoidance path based on the second type of second intermediate map information having higher priority than the first movement path in that the first movement path has priority. The path planning unit 123 may set a target speed in the obstacle section to a speed lower than the normal target speed. Thereby, safety of movement of the robot in the detected obstacle section is anticipated.

The path planning unit 123 may detect a density distribution of obstacles indicated by the third type of second intermediate map information. For example, the path planning unit 123 identifies, as an existence region of one obstacle, one or more grid groups in which grids whose existence accuracy indicates a predetermined positive threshold value are formed adjacent to each other. For each block including a predetermined plurality of grids, the path planning unit 123 counts the number of identified groups included in the block as a density of obstacles in a space. The number of grids included in one block may be sufficiently larger than the number of typically occupied grids per obstacle (for example, passerby) to be detected. The path planning unit 123 sets, as target speed on the first movement path in a block in which the obstacle density is greater than or equal to a threshold value of a predetermined density, target speed information indicating a target speed lower than the target speed on the first movement path in another block. The path planning unit 123 outputs the target speed information set for the first movement path to the movement control unit 124. On the basis of the target speed information input from the path planning unit 123, the movement control unit 124 sets the target speed in a section in which the obstacle density is greater than or equal to the threshold value of the predetermined density to a speed lower than the target speed in another section.

As described above, the robot system 1 according to the present embodiment is a movement control system including the first map generating unit 1221 and the second map generating unit 1222.

On the basis of a position of a physical object measured by the sensor measurement unit 110, the first map generating unit 1221 generates first map information indicating a distribution of existence states related to a possibility of the existence of the physical object.

The second map generating unit 1222 generates second map information classified in accordance with a duration time of the existence state on the basis of the first map information.

Also, the robot system 1 includes the path planning unit 123 that determines a movement path of the robot with reference to the second map information.

According to this configuration, second map information indicating a spatial distribution of existence states of physical objects classified in accordance with a duration period during which the existence states of the physical objects are maintained in the surrounding environment of the robot is obtained when the movement path is determined. Because the duration period is taken into account when the movement path is determined, it is possible to generate a movement path adapted to a difference between the physical objects during a duration period during which the existence state is maintained, unlike the case in which the second map information is not referred to.

Also, the second map information includes accuracy information indicating accuracy of the existence or nonexistence of a physical object as existence information indicating the existence state of the physical object in a space with respect to each grid, which indicates a space obtained by partitioning a predetermined region at regular intervals.

According to this configuration, a movement cost is calculated using accuracy obtained by quantifying the certainty of the existence or nonexistence of a physical object for each grid passing through a provisional path, and a movement path for controlling movement is determined on the basis of a movement cost for each provisional path. Thus, searching for a movement path which avoids a point at which a physical object is likely to exist and passes through a point at which a physical object does not exist is prompted, unlike a case in which the existence or nonexistence is only taken into account.

Also, the second map generating unit 1222 records clock time information indicating a clock time at which an existence state of a physical object is updated with respect to each grid, maintains the clock time information to be recorded when the existence state is maintained, and updates the clock time information when the existence state is changed.

According to this configuration, the last clock time at which the existence state of the physical object is changed for each grid is managed.

Thus, it is possible to easily determine the presence or absence of a change in the existence state of the physical object up to a current time by referring to the clock time information.

Also, the second map generating unit 1222 generates, as N duration times in which the existence state of the physical object is maintained, stored map information indicating the existence state of the physical object with respect to each of description permission times. Here, the second map generating unit 1222 generates stored map information of an $(n+1)^{th}$ (n is an integer of 1 to N−1) duration time, which is the next duration time longer than an $n^{th}$ duration time, on the basis of stored map information of the $n^{th}$ duration time among the N duration times.

According to this configuration, the stored map information is sequentially updated in ascending order of duration times in which existence states of physical objects are maintained in units of grids until a current time. Thus, stored map information indicating the existence states of physical objects with different time scales of changes can be consistently acquired in accordance with changes in the latest existence states of the physical objects.

Second Embodiment

Figure 7:
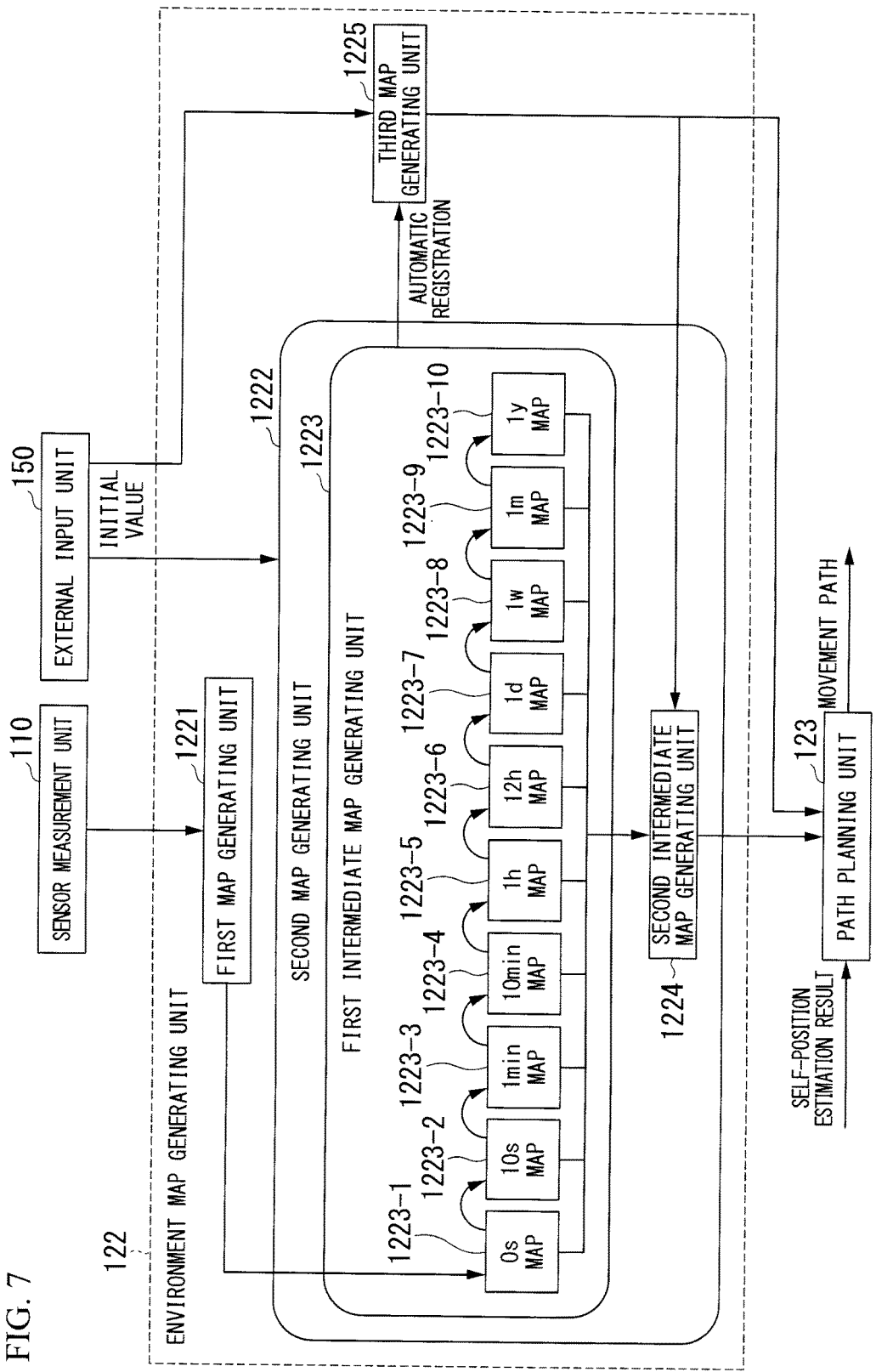
FIG. 7 is a schematic block diagram illustrating a functional configuration of an environment map generating unit according to a second embodiment.

Next, the second embodiment of the present embodiment will be described. The same reference signs are assigned to components which are the same as those of the first embodiment, and descriptions thereof is cited. In the following description, differences from the first embodiment will be mainly described. A functional configuration of an environment map generating unit 122 provided in a robot system 1 according to the present embodiment will be described. FIG. 7 is a schematic block diagram illustrating a functional configuration of the environment map generating unit 122 according to the present embodiment.

The environment map generating unit 122 includes a first map generating unit 1221, a second map generating unit 1222, and a third map generating unit 1225.

The third map generating unit 1225 acquires third map information as still another form of environment map information. The third map information is auxiliary information (auxiliary map information) which can be a factor having an influence on movement of a robot in a surrounding environment, and is information indicating a distribution of movement environments separate from accuracy information indicating an existence state of an obstacle up to a current time. Here, the term "auxiliary" indicates that a movement path cannot be independently determined but is useful for determining the movement path. Hereinafter, an example of the third map information will also be described in terms of path planning based on the third map information.

The third map generating unit 1225 generates change map information indicating an existence frequency of the obstacle for each grid as a first example of the third map information on the basis of stored map information acquired from the second map generating unit 1222. More specifically, the third map generating unit 1225 counts the number of times that an event in which there is a change from a state in which accuracy information is less than the $n^{th}$ nonexistence accuracy threshold value for each grid to a state in which the accuracy information is greater than or equal to the $n^{th}$ existence accuracy threshold value occurred as an existence frequency during a predetermined observation period using $n^{th}$ stored map information. As the observation period, for example, a predetermined cycle and a specific period during a certain cycle are set. That is, there is a characteristic in that the change map information indicates a characteristic distribution of existence states of obstacles according to a cycle or a period. The third map generating unit 1225 may generate the change map information for each piece of complete stored map information or for each piece of partial stored map information. The change map information may be directly referred to by the path planning unit 123 according to content or usage thereof or the change map information may be integrated with the second intermediate map information in the second intermediate map generating unit 1224 and indirectly referred to the via integrated map information obtained through the integration.

The path planning unit 123 directly or indirectly refers to the change map information generated by the third map generating unit 1225 and performs path planning of the robot. For example, the path planning unit 123 directly refers to the change map information and determines the presence or absence of a grid in which the existence frequency of the obstacle on the first movement path is greater than or equal to a predetermined existence frequency threshold value. When it is determined that there is a grid whose existence frequency is greater than or equal to the predetermined existence frequency threshold value, the path planning unit 123 determines that a speed lower than a predetermined standard target speed is a target speed, and sets target speed information indicating the determined target speed. Also, the path planning unit 123 may determine an avoidance path that avoids a section passing through a grid where the existence frequency is greater than or equal to the predetermined existence frequency threshold value as in the case in which interference with an obstacle occurs. Also, if there is no grid whose existence frequency is greater than or equal to the predetermined existence frequency threshold value, the path planning unit 123 determines that the first movement path is a movement path to be used for moving the robot, and determines that the predetermined standard target path is the target speed.

Also, when path planning is performed, it is only necessary for the path planning unit 123 to refer to the above-described integrated map information without referring to the change map information and the second intermediate map information. The integrated map information indicates, for example, higher existence accuracy between converted existence accuracy, which is obtained by converting the existence frequency of the obstacle for each grid, and existence accuracy indicated by the second intermediate map information. The converted existence accuracy is set to increase when the existence frequency of the obstacle increases.

While the above-described change map indicates a characteristic distribution of existence states of obstacles periodically or according to a period, the stored map information or the second intermediate map information derived from the stored map information only indicates a distribution of existence states of obstacles of which a duration time during which the existence states are maintained up to a current time is in a predetermined period. For example, it is possible to ascertain the existence of a short-period dynamic obstacle from the third type of second intermediate map information but it is not possible to ascertain whether the obstacle appears by chance or whether or not the obstacle periodically appears at a spot in a certain cycle. Also, in the second intermediate map information, even if there is no obstacle at the current time at a certain spot, it is not possible to ascertain that the obstacle does not exist at the spot at another point in time. Accordingly, by further referring to the change map information, it is possible to plan a path according to an appearance frequency of the obstacle in a predetermined cycle in the surrounding environment.

Also, the third map generating unit 1225 may count the appearance frequency of the obstacle for a specific period of each day, week, month, or year as a predetermined cycle and generate the change map information on the basis of the counted appearance frequency. The specific period is, for example, a time zone of a day, a day of a week, a date or a ten-day period of a month, a month or season of a year, or the like. In this case, the path planning unit 123 identifies a specific period to which a current clock time belongs and performs path planning by referring to change map information related to the specific period. Outside the specified period, the path planning unit 123 performs path planning without referring to the change map information as in the above-described embodiment. This enables path planning according to appearance characteristics of the obstacle during the specific period. For example, there may be a difference in an obstacle distribution or frequency between morning or evening in which traffic of passers-by and various vehicles significantly increases and midnight in which traffic relatively decreases. Accordingly, it is possible to plan a path according to a difference in an existence state of a physical object for each period.

As a second example of the third map information, the third map generating unit 1225 may acquire anisotropic map information including anisotropic information indicating anisotropy related to approval or disapproval of movement of the robot for each grid. The anisotropic information is information indicating whether or not the movement is approved in each movement direction or a degree of inhibition with respect to the movement (a degree of progress inhibition). The degree of progress inhibition indicates a degree of movement inhibition. The degree of progress inhibition may be expressed as a degree of progress ease indicating ease of movement or a degree of movement promotion. On the other hand, the accuracy information included in the first intermediate map information and the second intermediate map information described above is different from the anisotropic map information of the present example in that the accuracy information indicates approval or disapproval of movement in common for all movement directions or degrees thereof. In the anisotropic map information, a set movement direction may be discretized with resolution in a predetermined movement direction. In the example described below, progress inhibition degree information indicating approval or disapproval of movement or a degree of progress inhibition is set for each discrete direction obtained by discretizing the movement direction with respect to each single grid. Also, the approval or disapproval of movement may be represented by a numerical value of the degree of progress inhibition. That is, a set of progress inhibition degree information for each discretization direction indicates anisotropic information. The progress inhibition degree information for each grid in each movement direction may be configured as one piece of accuracy map information. In this case, the number of pieces of accuracy map information included in one set of anisotropic map information corresponds to the number of discrete movement directions. The movement direction is discretized into a total of eight directions at, for example, 45° intervals in a horizontal plane. In the accuracy map information, the progress inhibition degree information may not be necessarily set for all of the regions.

When the anisotropic map information according to the present example is acquired, the third map generating unit 1225 may receive anisotropic map information generated by another device via an external input unit 150 or generate the anisotropic map information on the basis of an operation signal via an operation input unit (not illustrated).

In this example, for example, the path planning unit 123 performs path planning with reference to the above-mentioned first type of second intermediate map information and anisotropic map information. When the anisotropic map information is referred to, the path planning unit 123 identifies, as a movement direction for each grid, for example, an adjacent grid which passes through a provisional path among adjacent grids adjacent to a grid of interest (grid of interest) on a provisional path. Then, the path planning unit 123 determines that a direction for the grid of interest from the identified adjacent grid is the movement direction, and identifies a discrete direction most approximate to the movement direction. The path planning unit 123 accumulates cost element values between grids of interest by further using the progress inhibition degree information related to the identified discrete direction and calculates a movement cost for each provisional path from a departure spot to a target spot. The path planning unit 123 determines that a provisional path having a smallest movement cost is a movement path. Therefore, the movement path is determined in consideration of the approval or disapproval of movement in a movement direction at each spot or a degree thereof.

Figure 8:
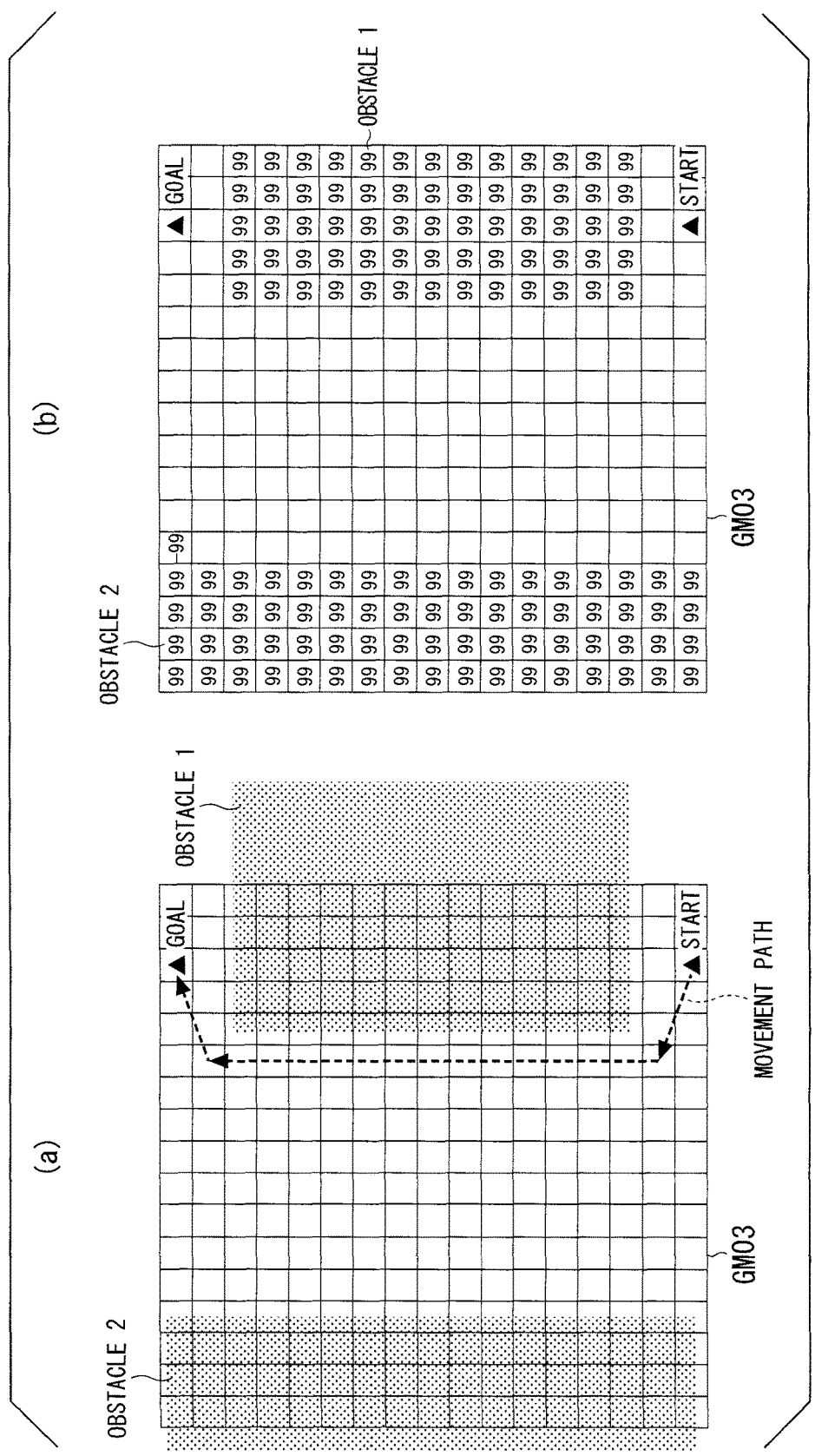
FIG. 8 is a diagram illustrating an example of a movement path obtained using second intermediate map information.

Next, an example of the generated movement path will be described. FIG. 8 is a diagram illustrating an example of a movement path obtained using the second intermediate map information. In the example illustrated in FIG. 8, the anisotropic map information is not used. In the example illustrated in FIG. 8(*a*), a filled portion of a region around a robot shown in a grid map GM03 indicates a region in which there is an obstacle, and an upper part of the drawing indicates a north direction. A target spot (goal) exists in the real north above a starting spot (start) in a state in which an obstacle 1 of two obstacles is interposed between the target spot and the starting spot. In this case, a shortest path having the least traveling among paths bypassing the obstacle 1 is obtained as a movement path to be generated. As illustrated in FIG. 8(*b*), accuracy information indicating existence accuracy sufficiently higher than a predetermined existence threshold value is set as a first type of second intermediate map used for generation of this movement path in a grid corresponding to a region in which obstacles 1 and 2 exist. In the example illustrated in FIG. 8(*b*), the existence accuracy in the region is 99. Accuracy information indicating existence accuracy sufficiently lower than the predetermined nonexistence accuracy threshold value is set in a grid corresponding to another region. In this example, the existence accuracy in the region is −99.

Figure 9:
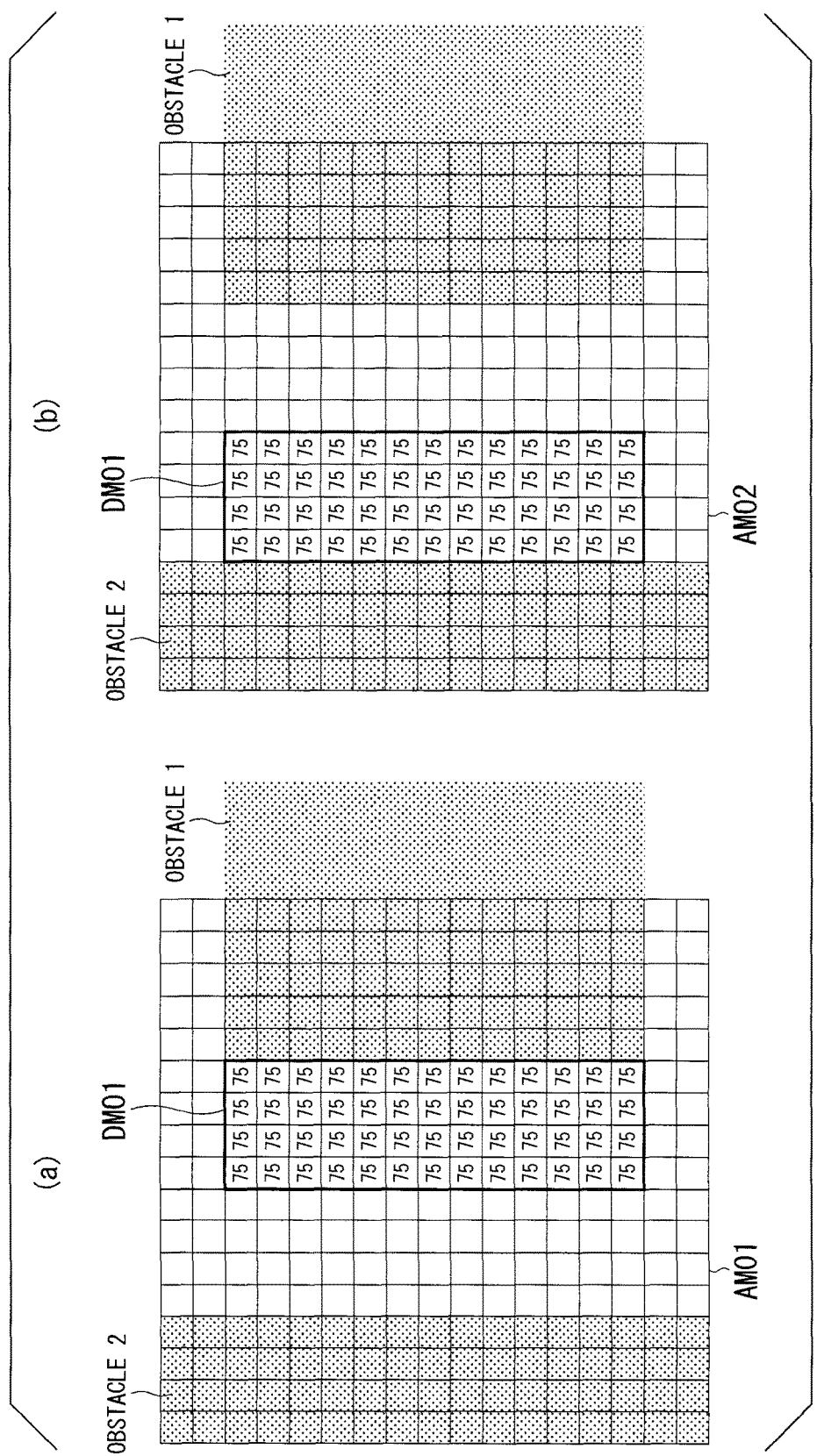
FIG. 9 is a diagram illustrating an example of third intermediate map information.

FIG. 9 illustrates anisotropic map information AM01 and AM02 as an example of the anisotropic map information according to the present example. The anisotropic map information AM01 indicates progress prohibition degree information in which the movement direction is north in a region which is the same as a region shown in the grid map GM03 for each grid. The degree of progress inhibition set in the progress inhibition degree information indicates approval/disapproval of movement. In this example, a value range of the degree of progress inhibition is similar to a value range of existence accuracy indicated by accuracy information constituting the first map information and the second map information. A degree of progress inhibition larger than a predetermined movement disapproval threshold value indicates that the movement is disapproved. A degree of progress inhibition smaller than a predetermined movement approval threshold value indicates that the movement is disapproved. In the anisotropic map information AM01, 75 is set as the degree of progress inhibition higher than the predetermined movement disapproval threshold value in a grid in an inhibition region DM01 in which movement is limited, and no value is set in the other regions. This inhibition region DM01 is set in a nonexistence region in which there is no obstacle. The anisotropic map information AM02 indicates progress prohibition degree information in which the movement direction is south in a region which is the same as the region shown in the grid map GM03 for each grid. In the anisotropic map information AM02, 75 is set as the degree of progress inhibition larger than the predetermined movement disapproval threshold value in a grid in an inhibition region DM02 which is an obstacle to movement, and a value of the degree of progress inhibition is set in the other areas. This inhibition region DM02 is set in a region that does not overlap the inhibition region DM01 as a nonexistence region in which there is no obstacle. The inhibition region DM02 is set on the right side in the north direction in a nonexistence region in which neither the obstacle 1 nor the obstacle 2 exists, but is not set on the left side. The inhibition region DM02 is set on the right side in the south direction in the nonexistence region, but is not set on the left side. In other words, left-hand traffic can be considered as being set for movement in the north-south direction in the nonexistence region.

Figure 10:
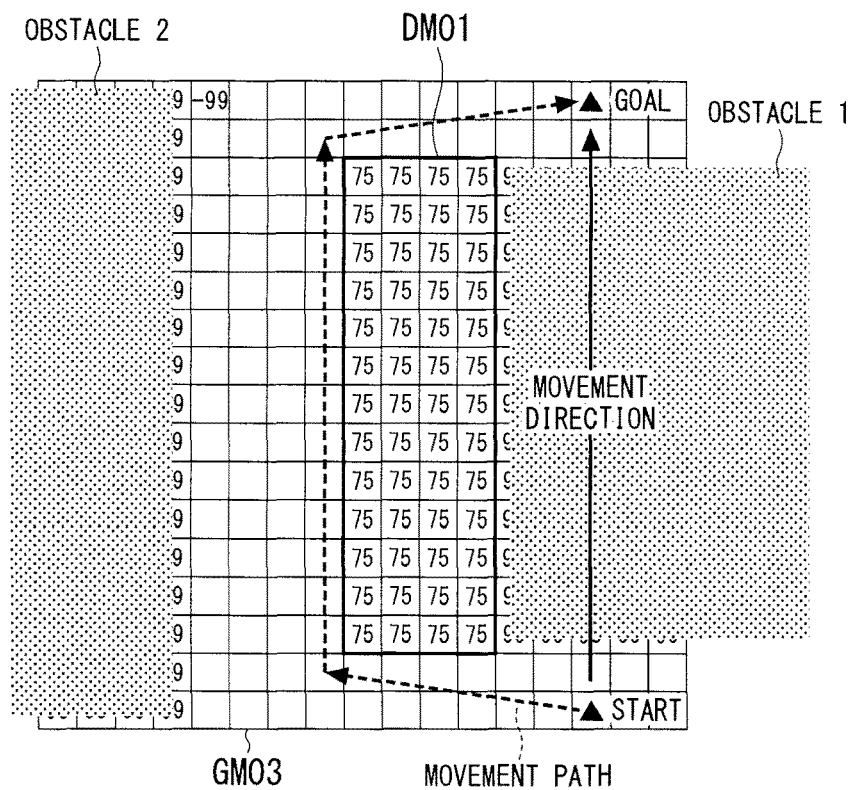
FIG. 10 is a diagram illustrating an example of a movement path obtained using the third intermediate map information.

FIG. 10 is a diagram illustrating an example of a movement path obtained using the anisotropic map information. In the example illustrated in FIG. 10, all of a region related to path planning, a starting spot, and a target spot are similar to those of the example illustrated in FIG. 8. However, in this example, the second intermediate map information illustrated in FIG. 8(*b*) and the anisotropic map information illustrated in FIG. 9 are referred to. Here, when auxiliary map information for each movement direction is referred to, the path planning unit 123 compares existence accuracy indicated by accuracy information included in the second intermediate map information with a degree of progress inhibition indicated by progress inhibition degree information included in the anisotropic map information for each grid for which the progress inhibition degree information is set and adopts a larger value as new existence accuracy. For a grid for which the progress inhibition degree information is not set, the existence accuracy indicated by the accuracy information is adopted as it is. Then, the path planning unit 123 calculates a difference of a predetermined offset value from the adopted existence accuracy as a cost element value, and calculates a sum of calculated cost element values between grids on each provisional path as a movement cost. The path planning unit 123 determines that a provisional path having the lowest calculated movement cost is the movement path. The movement path determined under this condition becomes a path that bypasses a region of the obstacle 1 and the inhibition region DM01 which inhibits movement in the north direction. Although travel is longer than the shortest path illustrated in FIG. 8, left side passage of the robot is realized in the nonexistence region in which neither the obstacle 1 nor the obstacle 2 exists.

Figure 11:
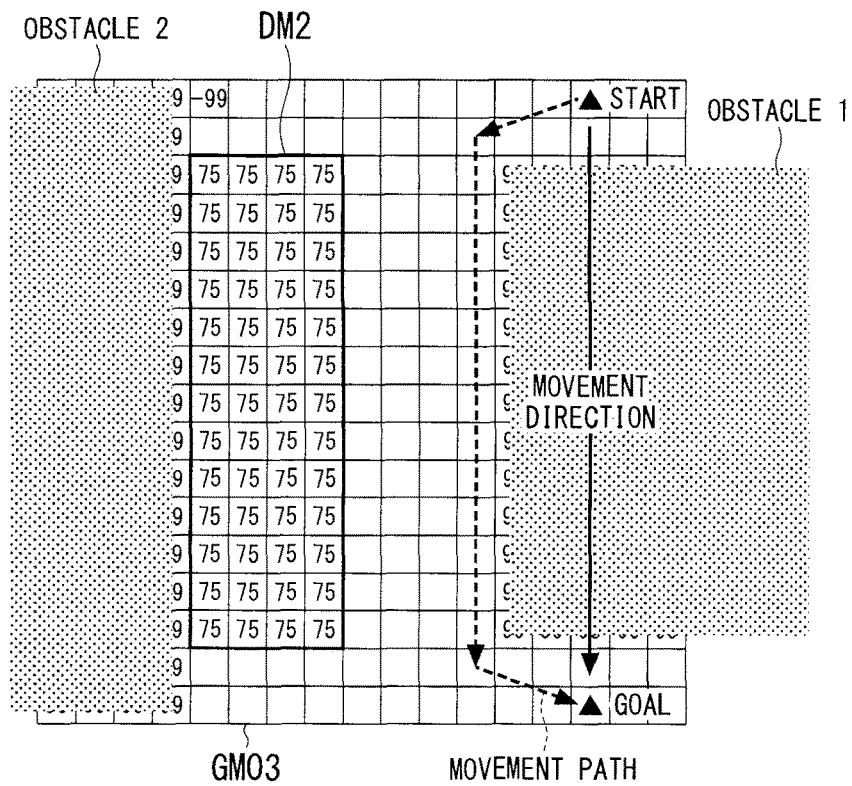
FIG. 11 is a diagram illustrating another example of the movement path obtained using the third intermediate map information.

FIG. 11 is a diagram illustrating another example of the movement path obtained using the anisotropic map information. In the example illustrated in FIG. 11, setting of a starting spot and a target spot is opposite to the example illustrated in FIG. 10. That is, the target spot is set to the real south below the starting spot in a state in which the obstacle 1 is interposed between the target spot and the starting spot. The other conditions are similar to those in the example illustrated in FIG. 10. A movement path determined under this condition becomes a path which bypasses the region of the obstacle 1. This path corresponds to the shortest path illustrated in FIG. 8, which is a path in which the starting spot and the target spot are reversed, and does not pass through the inhibition region DM02 which inhibits movement in the south direction. Also in this case, left side passage of the robot is realized in the nonexistence region in which neither the obstacle 1 nor the obstacle 2 exists.

Figure 12:
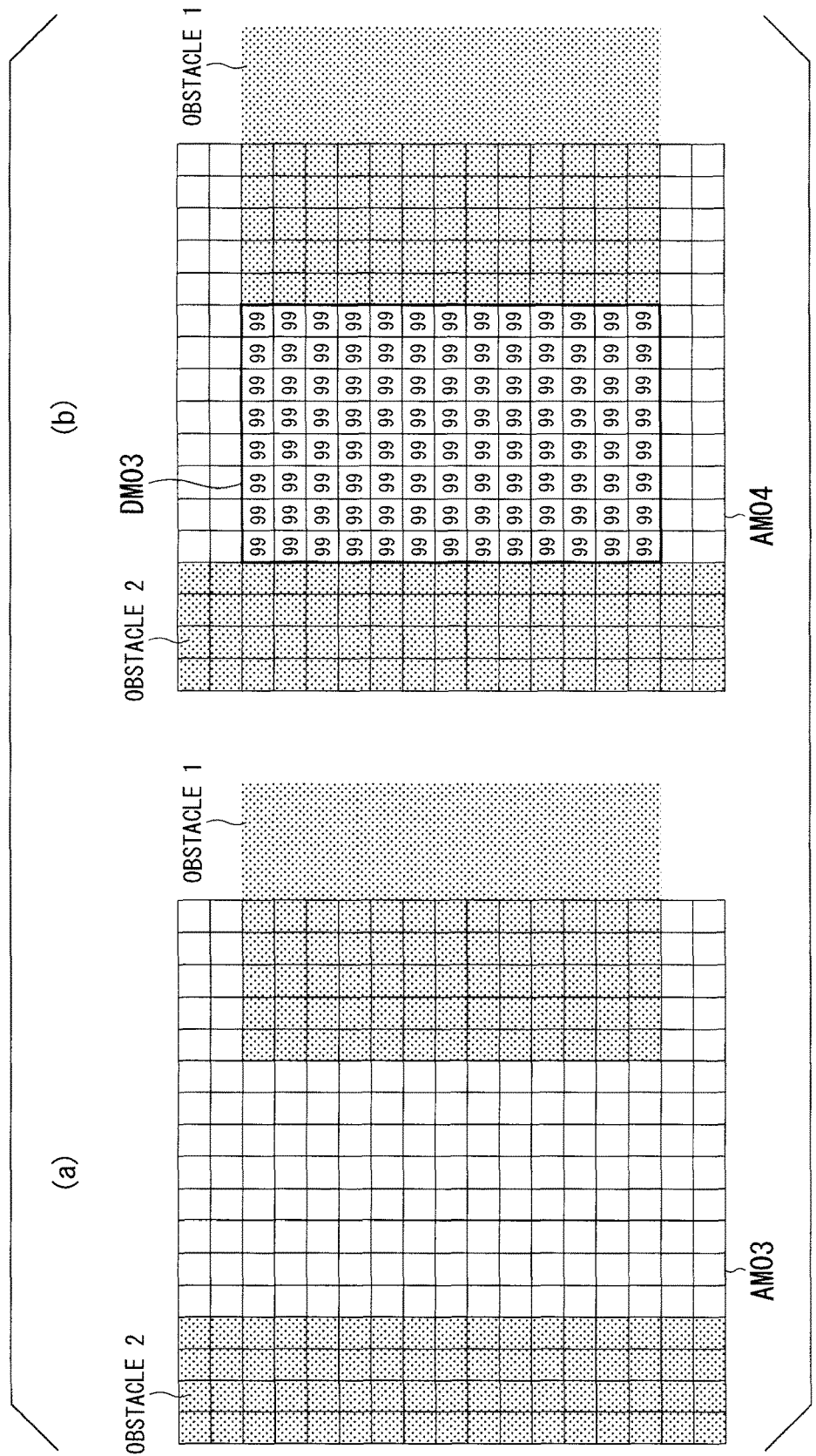
FIG. 12 is a diagram illustrating another example of the third intermediate map information.

In the examples illustrated in FIGS. 9 to 11, left-hand traffic in the nonexistence region is taken as an example. However, according to a setting of the anisotropic map information, it is also possible to realize one-way traffic according to the present embodiment. In this case, in the nonexistence region in which there is no obstacle, it is only necessary that an open region in which no inhibition region is set be present in one movement direction and a closed inhibition region be set in another movement direction. FIG. 12 illustrates an example of setting of anisotropic map information indicating one-way traffic in the south direction in the nonexistence region in which neither the obstacle 1 nor the obstacle 2 exists. As illustrated in FIG. 12(a), for movement in the south direction, the inhibition region is not set in the nonexistence region. On the other hand, as illustrated in FIG. 12(b), an inhibition region DM03 is set such that movement in the north direction is completely closed in the nonexistence region. Here, the inhibition region DM03 is distributed so that an existence region of the obstacle 1 and an existence region of the obstacle 2 are connected in an east-west direction, which is a direction in which the nonexistence region between the obstacles 1 and 2 intersects the north direction.

Figure 13:
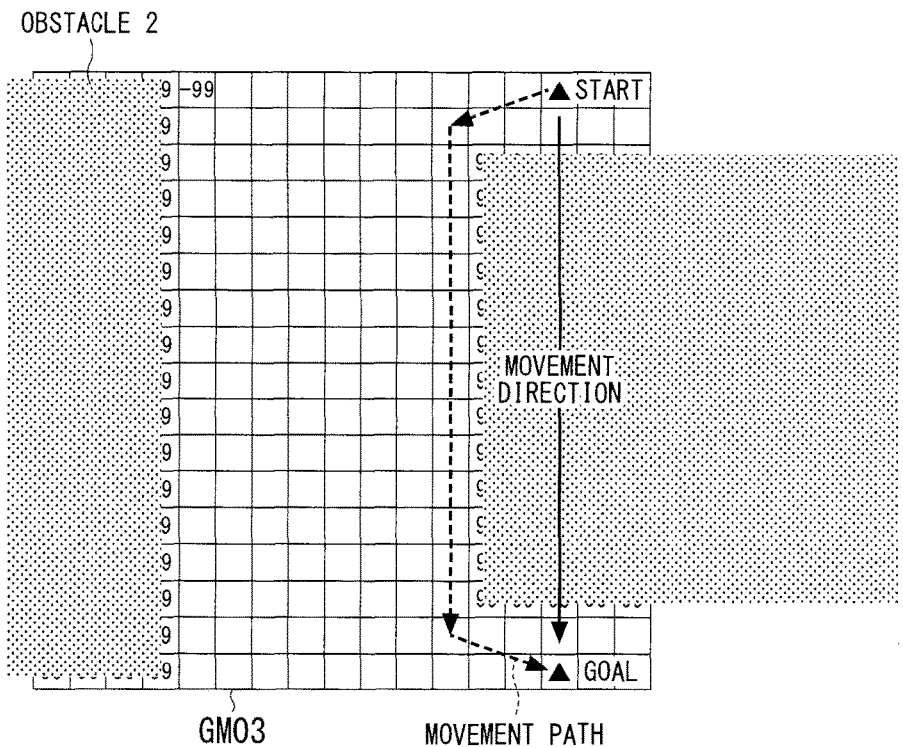
FIG. 13 is a diagram illustrating still another example of the movement path obtained using the third intermediate map information.

FIG. 13 is a diagram illustrating an example of a movement path obtained using the anisotropic map information illustrated in FIG. 12. In the example illustrated in FIG. 13, all of a region related to path planning, a starting spot, and a target spot are similar to those of the example illustrated in FIG. 11. According to the anisotropic map information illustrated in FIG. 12, a nonexistence region between the obstacles 1 and 2 is not completely closed by an inhibition region with respect to the south direction and an open part exists. As a result, the shortest path which bypasses the obstacle 1 in the nonexistence region between the obstacles 1 and 2 is obtained as a movement path from the starting spot to the target spot.

Figure 14:
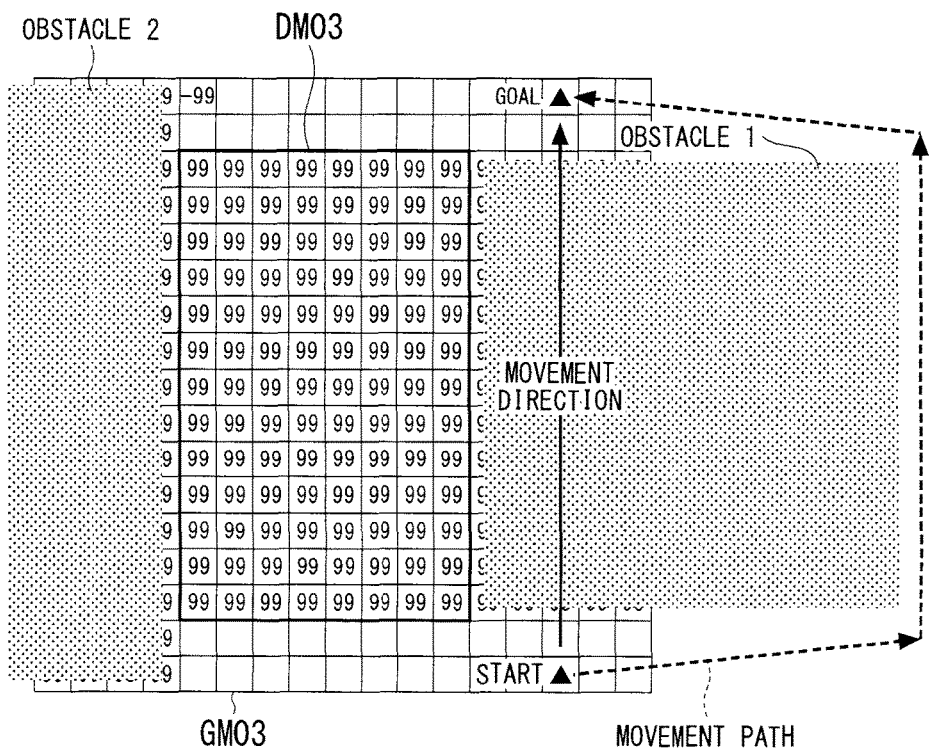
FIG. 14 is a diagram illustrating still another example of the movement path obtained using the third intermediate map information.

FIG. 14 illustrates still another example of the movement path obtained using the anisotropic map information illustrated in FIG. 12. In the example illustrated in FIG. 14, all of a region related to path planning, a starting spot, and a target spot are similar to those of the example illustrated in FIG. 8. According to the anisotropic map information illustrated in FIG. 12, for movement in the north direction, a nonexistence region between the obstacles 1 and 2 is closed by an inhibition region. As a result, a path that bypasses an east side of the obstacle 1 is obtained as a movement path from the starting spot to the target spot without passing through the nonexistence region between the obstacles 1 and 2.

The path planning unit 123 may perform a well-known image recognition process on an image captured by an image capturing unit provided in the robot system 1 to detect a road sign indicating left-hand traffic or one-way traffic. When the road sign indicating left-hand traffic is detected, the path planning unit 123 acquires third map information indicating left-hand traffic as anisotropy of a movement direction in a space during movement from the third map generating unit 1225. When the road sign indicating one-way traffic is detected, the path planning unit 123 acquires third map information indicating one-way traffic as the anisotropy of the movement direction in a space during movement from the third map generating unit 1225. Then, the path planning unit 123 performs the above-described path planning with reference to the second map information and the further acquired third map information.

The third map information to be referred to at a time of path planning is not limited to the third map information of the first example and the second example described above. For example, the third map information may include road surface information indicating a road surface state for each grid. The road surface state may be represented by, for example, the presence or absence of inclination of the road surface, an inclination angle, an inclination direction, or a combination thereof. A road surface condition may be represented by, for example, the presence or absence of an irregularity on the road surface or a degree of irregularity. Here, the irregularity is a state in which lifting and lowering of the road surface with respect to a main surface of a base of the robot in the vertical direction (the Z direction) are repeated in a cycle less than or equal to a dimension of the robot in the horizontal direction with respect to movement in a direction parallel to the main surface.

Also, the road surface state may be represented by the presence or absence of a structure whose road surface state is variable and a type thereof. Examples of such a structure include manholes, side grooves, and the like. The robot can move on manholes and side grooves in a state in which lids are installed thereon. On the other hand, the robot cannot safely move thereon in a state in which lids are not installed. The path planning unit 123 may convert the road surface state into a degree of progress inhibition using a predetermined conversion rule so that the degree of progress inhibition increases as a degree of movement inhibition increases. For example, conversion is performed so that the degree of progress inhibition increases as the irregularity significantly increases. Conversion is performed so that the degree of progress inhibition increases as an inclination angle increases. According to a type of structure by which the state of the road surface is variable, conversion into the degree of progress inhibition according to a possibility of impairment of traveling safety may be performed. The path planning unit 123 further determines a movement path by further referring to the degree of progress inhibition obtained through the conversion in the corresponding grid. Also, the path planning unit 123 may set a movement speed to a low speed for a grid having a high degree of progress inhibition among grids on the determined movement path.

Also, the third map information may include maximum movement speed information indicating a maximum movement speed allowed at a position for each grid. The path planning unit 123 may set a movement speed in each grid on the determined movement path to a speed less than or equal to the maximum movement speed indicated by maximum movement speed information set in the grid.

Also, although various types of second intermediate map information or stored map information are referred to along with the third map information when the path planning unit 123 performs path planning in the above-described example, the first map information generated by the first map generating unit 1221 may be referred to according to the purpose of generating the movement path. In this case, the second map generating unit 1222 may be omitted.

As described above, the robot system 1 according to the present embodiment is a movement control system including the first map generating unit 1221 and the third map generating unit 1225. On the basis of a position of a physical object measured by the sensor measurement unit 110, the first map generating unit 1221 generates first map information indicating a distribution of existence states related to a possibility of the existence of the physical object. The third map generating unit 1225 acquires movement environment map information indicating a distribution of movement environments of the robot.

Also, the robot system 1 further includes the path planning unit 123 which determines a movement path of the robot with reference to the third map information in addition to the first map information.

According to this configuration, when the movement path is determined, various types of movement environment information are taken into account in addition to the existence state of the physical object in the surrounding environment of the robot. Thus, by referring to the third map information, it is possible to generate a movement path adapted to a factor having an influence on the movement of the robot in the movement environment in addition to the existence state of the physical object at a current time.

Also, the third map information may be anisotropic map information including anisotropic information indicating anisotropy regarding the movement environment of the robot.

According to this configuration, when a movement path is determined, anisotropy related to approval or disapproval of movement and a degree of inhibition is taken into account. Thus, generation of a path that passes through a region in which movement is allowed in each movement direction or a region in which movement can be easily performed and that avoids a region in which movement is limited or a region in which movement is difficult is prompted. For example, it is possible to generate a movement path in consideration of one-way traffic in which the movement direction is limited to one direction or one-way traffic in which the movement direction is restricted for each region.

Also, the third map information may be change map information including change information indicating a change state of the existence state of the physical object for each predetermined element space.

According to this configuration, a change in the existence state of the physical object at each point is taken into account when the movement path is determined. As the change in the existence state, for example, it is possible to generate a movement path suitable for a distribution of frequencies, time zones, or the like at which physical objects exist.

Also, the third map generating unit generates change information for each predetermined element space on the basis of stored map information indicating the existence state of the physical object with respect to a predetermined duration period during which the existence state is maintained.

Thus, it is possible to efficiently acquire change information indicating the change in the existence state of the physical object according to a predetermined time scale at which the existence state of the physical object changes. When the change information is referred to, it is possible to generate a movement path in further consideration of a change situation of the physical object corresponding to the time scale according to the purpose.

In the above-described embodiment, each storage region of data stored in the self-position estimating unit 121, the environment map generating unit 122, the path planning unit 123, the movement control unit 124, the axle control unit 125, and the motor control unit 126 functions as a storage unit of data. These storage units are typically configured to include various storage media built into or externally connected to the robot system 1. As these storage media, all storage media at present or in the future can be used. Registers and the like used for various types of calculation in the robot system 1 also constitute a part of the storage unit. A storage mode is not limited to a mode in which data stored for a time longer than a predetermined time is held, but also includes a mode in which the data is temporarily stored for various processes and then erased or updated.

Also, specific details and numerical values of the information exemplified in the above-described embodiment are arbitrary, and the present invention is not limited to the specific details and numerical values. Also, in a determination of a magnitude relative to a threshold value and a determination of coincidence/non-coincidence, a determination including a threshold value as in the term "greater than or equal to," "less than or equal to," or the like or a determination not including a threshold value as in the term "larger than," "smaller than," "exceeds," "does not exceed," "more than," "less than," or the like can be performed freely.

For example, according to the setting of the threshold value, the term "greater than or equal to" is substantially equivalent to the term "larger than," "exceeds," or "more than," even if the terms are replaced with each other and the term "less than or equal to" is substantially equivalent to the term "smaller than," "does not exceed," or "less than," even if the terms are replaced with each other.

With respect to the above-described embodiments, each storage region of data can be configured as a storage unit of data. These storage units typically include various memories which are internally embedded or externally connected, hard disks, and the like. However, as these storage media, all storage media at present or in the future can be used. A register or the like used for calculation can also be treated as a storage unit. A storage mode includes a mode in which data is temporarily stored for processing and erased or updated in a short time as well as a mode in which long-time storage is held.

Also, specific details and values of the information exemplified in the above-described embodiment are arbitrary, and the present invention is not limited to the specific details and values. Also, in a determination of a magnitude relative to a value and a determination of coincidence/non-coincidence, a determination including a value as in the term "greater than or equal to," "less than or equal to," or the like or a determination not including a value as in the term "larger than," "smaller than," "exceeds," "does not exceed," "more than," "less than," or the like can be performed freely. Accordingly, for example, according to the setting of the value, the term "greater than or equal to" is substantially equivalent to the term "larger than," "exceeds," or "more than," even if the terms are replaced with each other and the term "less than or equal to" is substantially equivalent to the term "smaller than," "does not exceed," or "less than," even if the terms are replaced with each other.

In each of the above-described embodiments, the self-position estimating unit 121, the environment map generating unit 122, the path planning unit 123, the movement control unit 124, the axle control unit 125, and the motor control unit 126 may be software function units realized by a computer system including a calculation processing circuit which performs a process indicated by a command described in a program, but they may be hardware functional units such as LSIs.

Also, although the controller 120 includes the self-position estimating unit 121, the environment map generating unit 122, the path planning unit 123, the movement control unit 124, the axle control unit 125, and the motor control unit 126, but one or both of the axle control unit 125 and the motor control unit 126 may be omitted.

Each element or device for the robot system described above can be implemented by hardware with or without software. In some cases, the robot system may be implemented by one or more hardware processors and one or more software components wherein the one or more software components are to be executed by the one or more hardware processors to implement each element or device for the robot system. In some other cases, the robot system may be implemented by a system of circuits or circuitry configured to perform each operation of each element or device for the robot system.

The systems and methods in the above-described embodiments may be deployed in part or in whole through a machine or circuitry that executes computer software, software components, program codes, and/or instructions on one or more processors. The one or more processors may be part of a general-purpose computer, a server, a cloud server, a client, network infrastructure, mobile computing platform, stationary computing platform, or other computing platform. One or more processors may be any kind of computational or processing device or devices which are capable of executing program instructions, codes, binary instructions and the like. The one or more processors may be or include a signal processor, digital processor, embedded processor, microprocessor or any variants such as a co-processor, for example, math co-processor, graphic co-processor, communication co-processor and the like that may directly or indirectly facilitate execution of program codes or program instructions stored thereon. In addition, the one or more processors may enable execution of multiple programs, threads, and codes. The threads may be executed simultaneously to enhance the performance of the one or more processors and to facilitate simultaneous operations of the application. Program codes, program instructions and the like described herein may be implemented in one or more threads. The one or more processors may include memory that stores codes, instructions and programs as described herein. The processor may access a non-transitory processor-readable storage medium through an interface that may store codes, instructions and programs as described herein and elsewhere. The non-transitory processor-readable storage medium associated with the processor for storing programs, codes, program instructions or other type of instructions capable of being executed by the computing or processing device may include but may not be limited to one or more of a memory, hard disk, flash drive, RAM, ROM, CD-ROM, DVD, cache and the like.

A processor may include one or more cores that may enhance speed and performance of a multiprocessor. In some embodiments, the process may be a dual core processor, quad core processors, other chip-level multiprocessor and the like that combine two or more independent cores.

The methods and systems described herein may be deployed in part or in whole through a machine that executes computer software on a server, client, firewall, gateway, hub, router, or other such computer and/or networking hardware.

The software program may be associated with one or more client that may include a file client, print client, domain client, internet client, intranet client and other variants such as secondary client, host client, distributed client and the like. The client may include one or more of memories, processors, computer readable media, storage media, physical and virtual ports, communication devices, and interfaces capable of accessing other clients, servers, machines, and devices through a wired or a wireless medium, and the like. The programs or codes as described herein may be executed by the client. In addition, other devices required for execution of methods as described in this application may be considered as a part of the infrastructure associated with the client. The client may provide an interface to other devices including servers, other clients, printers, database servers, print servers, file servers, communication servers, distributed servers and the like. This coupling and/or connection may facilitate remote execution of program across the network. The networking of some or all of these devices may facilitate parallel processing of a program or method at one or more location. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The software program may be associated with one or more servers that may include a file server, print server, domain server, internet server, intranet server and other variants such as secondary server, host server, distributed server and the like. The server may include one or more of memories, processors, computer readable media, storage media, physical and virtual ports, communication devices, and interfaces capable of accessing other servers, clients, machines, and devices through a wired or a wireless medium, and the like. The methods, programs or codes as described herein may be executed by the server. In addition, other devices required for execution of methods as described in this application may be considered as a part of the infrastructure associated with the server. The server may provide an interface to other devices including clients, other servers, printers, database servers, print servers, file servers, communication servers, distributed servers, social networks, and the like. This coupling and/or connection may facilitate remote execution of program across the network. The networking of some or all of these devices may facilitate parallel processing of a program or method at one or more locations. Any of the devices attached to the server through an interface may include at least one storage medium capable of storing programs, codes and/or instructions. A central repository may provide program instructions to be executed on different devices. In this implementation, the remote repository may act as a storage medium for program codes, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing devices associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory, for example, USB sticks or keys, floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods, devices, apparatus, and systems described herein may transform physical and/or or intangible items from one state to another. The methods and systems described herein may also transform data representing physical and/or intangible items from one state to another.

The modules, engines, components, and elements described herein, including in flow charts and block diagrams throughout the figures, imply logical boundaries between the modules, engines, components, and elements. However, according to software or hardware engineering practices, the modules, engines, components, and elements and the functions thereof may be implemented on one or more processors, computers, machines through computer executable media, which are capable of executing program instructions stored thereon as a monolithic software structure, as standalone software modules, or as modules that employ external routines, codes, services, or any combination of these, and all such implementations may be within the scope of the present disclosure. Examples of such machines may include, but is not limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, processor-embedded eyewear and the like. Furthermore, the modules, engines, components, and elements in the flow chart and block diagrams or any other logical component may be implemented on one or more machines, computers or processors capable of executing program instructions. Whereas the foregoing descriptions and drawings to which the descriptions have been referred set forth some functional aspects of the disclosed systems, no particular arrangement of software for implementing these functional aspects should be inferred from these descriptions unless explicitly stated or otherwise clear from the context. It will also be appreciated that the various steps identified and described above may be varied, and that the order of steps may be adapted to particular applications of the techniques disclosed herein. All such variations and modifications are intended to fall within the scope of this disclosure. The descriptions of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

According to at least one embodiment described above, the first map generating unit 1221 which generates first map information indicating a distribution of existence states related to a possibility of the existence of a physical object on the basis of a position of a physical object measured by the sensor measurement unit 110, and the second map generating unit 1222 which generates second map information classified in accordance with a duration time of the existence state on the basis of the first map information are provided so that it is possible to generate a path corresponding to a more detailed surrounding environment.

While several embodiments of the present invention have been described, these embodiments have been presented by way of example only and are not intended to limit the scope of the invention. These embodiments may be embodied in a variety of other forms. Various omissions, substitutions, and changes may be made without departing from the spirit of the invention. The invention described in the accompanying claims and equivalents thereof are intended to cover such embodiments or modifications as would fall within the scope and spirit of the invention.

EXPLANATION OF REFERENCES

1 Robot system
110 Sensor measurement unit
111 IMU
112 Encoder
113 GPS unit
114 LRF
120 Controller
121 Self-position estimating unit
122 Environment map generating unit
123 Path planning unit
124 Movement control unit
125 Axle control unit
126 Motor control unit
130 Environment map storing unit
140 Driving unit
141 Left wheel motor
142 Right wheel motor
150 External input unit
1221 First map generating unit
1222 Second map generating unit
1223 First intermediate map generating unit
1224 Second intermediate map generating unit
1225 Third map generating unit

What is claimed is:
1. A movement control system comprising:
an environmental map storing unit;

one or more memories storing instructions;
one or more hardware processors executing the instructions to perform operations comprising:
    generating first map information indicating a distribution of existence states related to a possibility of existence of a physical object on the basis of a position of the physical object measured by a measurement unit;
    generating, based on the first map information, second map information classified in accordance with a duration time of the existence state;
    storing the first and second map information in the environmental map storing unit;
    maintaining clock time information indicating clock times at which existence states are updated for predetermined element spaces, when the existence state of the physical object remains unchanged;
    updating the clock time information to clock time information indicating a clock time related to a change when the existence state of the physical object is changed;
    determining a first movement path based on the first map information and the second map information; and
    controlling movement of a robot based on the first movement path.

2. The movement control system according to claim 1, wherein the second map information includes existence information indicating the existence state for each predetermined element space.

3. The movement control system according to claim 2, wherein the existence information includes accuracy information indicating accuracy of presence or absence of the physical object.

4. The movement control system according to claim 1, wherein, when stored map information indicating the existence state of the physical object for each of N (N is an integer greater than or equal to 2) duration times during which the existence state is maintained is generated, the operations further comprise generating stored map information of an (n+1)th duration time (n is an integer of 1 to N−1), which is a next duration time longer than an nth duration time, on the basis of stored map information of the nth duration time.

5. The movement control system according to claim 1, wherein the first movement path comprises a path from a departure spot to a target spot with reference to the second map information.

6. The movement control system according to claim 5, wherein the operations further comprise:
    generating long-period map information indicating the existence state of a physical object whose duration time is greater than or equal to a first period, and
    generating a second movement path with reference to the long-period map information.

7. The movement control system according to claim 6, wherein the operations further comprise:
    generating medium-period map information indicating the existence state of a physical object whose duration time is greater than or equal to a second period and is less than the first period, and
    determining presence or absence of an interference section, which is a section in which a physical object of the first movement path exists, with reference to the medium-period map information; and
    generating a third movement path for avoiding the interference section with reference to the medium-period map information when the interference section occurs.

8. The movement control system according to claim 7, wherein the operations further comprise:
    generating short-period map information indicating the existence state of a physical object whose duration time is less than the second period;
    determining presence or absence of an interference section, which is a section in which a physical object exists in the first movement path, with reference to the short-period map information; and
    degrading a movement speed in the interference section of the first movement path when the interference section occurs.

9. The movement control system according to claim 1, comprising:
    a movement environment map information acquiring unit configured to acquire movement environment map information indicating a distribution of movement environments of the robot.

10. The movement control system according to claim 9, wherein the movement environment map information includes anisotropic information indicating anisotropy related to the movement environment of the robot.

11. The movement control system according to claim 9, wherein the movement environment map information includes change information indicating a change situation of the existence state of the physical object for each predetermined element space.

12. The movement control system according to claim 11, wherein:
    the operations further comprise generating stored map information indicating the existence state for a predetermined duration time during which the existence state remains unchanged; and
    the movement environment map information acquiring unit generates the change information for each predetermined element space on the basis of the stored map information.

13. A movement control system comprising:
a movement environment map information acquiring unit configured to acquire movement environment map information indicating a distribution of movement environments of a robot;
an environmental map storing unit;
one or more memories storing instructions; and
one or more hardware processors executing the instructions to perform operations comprising:
    generating map information indicating a distribution of existence states related to a possibility of existence of a physical object on the basis of a position of the physical object measured by a measurement unit;
    storing the map information in the environmental map storing unit;
    maintaining clock time information indicating clock times at which the existence states are updated for predetermined element spaces, when the existence state of the physical object remains unchanged;
    updating the clock time information to clock time information indicating a clock time related to a change when the existence state of the physical object is changed;
    determining a movement path based on the map information; and
    controlling movement of a robot based on the movement path.

14. The movement control system according to claim 13, wherein the movement environment map information includes anisotropic information indicating anisotropy related to the movement environment of the robot.

15. The movement control system according to claim 13, wherein the movement environment map information includes change information indicating a change situation of the existence state of the physical object for each predetermined element space.

16. The movement control system according to claim 15, wherein the movement environment map information acquiring unit generates the change information for each predetermined element space on the basis of stored map information indicating the existence state for a predetermined duration time during which the existence state is maintained.

17. A non-transitory computer-readable storage medium that stores instructions which, when executed by a computer, cause the computer to perform operations comprising:
generating first map information indicating a distribution of existence states related to a possibility of existence of a physical object on the basis of a position of the physical object measured by a measurement unit;
generating second map information classified in accordance with a duration time of the existence state on the basis of the first map information;
storing the first and second map information;
maintaining clock time information indicating clock times at which existence states are updated for predetermined element spaces, when the existence state of the physical object remains unchanged;
updating the clock time information to clock time information indicating a clock time related to a change when the existence state of the physical object is changed;
determining a movement path based on the first and second map information; and
controlling movement of a robot based on the movement path.

18. A non-transitory computer-readable storage medium storing instructions which, when executed by a computer, cause the computer to perform operations comprising:
generating map information indicating a distribution of existence states related to a possibility of existence of a physical object on the basis of a position of the physical object measured by a measurement unit;
storing the map information;
maintaining clock time information indicating clock times at which existence states are updated for predetermined element spaces, when the existence state of the physical object remains unchanged;
updating the clock information to clock time information indicating a clock time related to a change when the existence state of the physical object is changed;
determining a movement path based on the map information;
controlling movement of a robot based on the movement path; and
acquiring movement environment map information indicating a distribution of movement environments of the robot.

* * * * *